United States Patent
Brundage et al.

(10) Patent No.: US 8,059,858 B2
(45) Date of Patent: Nov. 15, 2011

(54) IDENTIFICATION DOCUMENT AND RELATED METHODS

(75) Inventors: Trent J. Brundage, Tigard, OR (US); Mahmood Sher-Jan, Lake Oswego, OR (US); Brett T. Hannigan, Philadelphia, PA (US); Robert T. Durst, Jr., Dunstable, MA (US)

(73) Assignee: Digimarc Corporation, Beaverton, OR (US)

( * ) Notice: Subject to any disclaimer, the term of this patent is extended or adjusted under 35 U.S.C. 154(b) by 1133 days.

(21) Appl. No.: 11/527,361

(22) Filed: Sep. 25, 2006

(65) Prior Publication Data

US 2007/0016790 A1    Jan. 18, 2007

Related U.S. Application Data

(63) Continuation of application No. 10/686,495, filed on Oct. 14, 2003, now abandoned.

(60) Provisional application No. 60/421,254, filed on Oct. 25, 2002, provisional application No. 60/494,709, filed on Aug. 12, 2003, provisional application No. 60/495,236, filed on Aug. 13, 2003, provisional application No. 60/495,373, filed on Aug. 14, 2003.

(51) Int. Cl.
*G06K 9/00*    (2006.01)

(52) U.S. Cl. ........ 382/100; 382/115; 382/116; 382/119; 382/135; 283/13; 705/75

(58) Field of Classification Search ................ 382/100, 382/115, 116, 119, 135, 137, 232, 276; 358/3.28; 340/5, 5.1, 86; 713/176; 283/13; 705/75; 380/54, 55

See application file for complete search history.

(56) References Cited

U.S. PATENT DOCUMENTS

| | | | |
|---|---|---|---|
| 4,728,984 A | 3/1988 | Daniele |
| 4,930,160 A | 5/1990 | Vogel |
| 5,253,066 A | 10/1993 | Vogel |
| 5,284,364 A | 2/1994 | Jain |
| 5,337,361 A | 8/1994 | Wang et al. |
| 5,568,268 A | 10/1996 | Tsuji et al. |
| 5,579,124 A | 11/1996 | Aijala et al. |
| 5,719,948 A | 2/1998 | Liang |
| 5,745,604 A | 4/1998 | Rhoads |
| 5,748,763 A | 5/1998 | Rhoads |

(Continued)

FOREIGN PATENT DOCUMENTS

EP    0730242    9/1996

(Continued)

OTHER PUBLICATIONS

U.S. Appl. No. 08/154,866, filed Nov. 18, 1993, Geoffrey B. Rhoads.

(Continued)

*Primary Examiner* — Samir Ahmed
*Assistant Examiner* — Ali Bayat

(57) ABSTRACT

The present disclosure relates generally to identification documents and related methods and apparatus. One claim recites a method to determine whether to authenticate an identification document through digital watermarking or through an alternative process. The method includes: receiving data carried by the identification document corresponding to a detection trigger; if the received data indicates an expected presence of digital watermarks, attempting to authenticate the identification document by analyzing digital watermarking carried by the identification document; and if the received data indicates an expected absence of digital watermarks, attempting to authenticate the identification document through an alternative process. Other claims and combinations are provided too.

20 Claims, 13 Drawing Sheets

U.S. PATENT DOCUMENTS

| | | |
|---|---|---|
| 5,765,152 A | 6/1998 | Erickson |
| 5,768,426 A | 6/1998 | Rhoads |
| 5,786,587 A | 7/1998 | Colgate, Jr. |
| 5,790,662 A * | 8/1998 | Valerij et al. ............... 380/2 |
| 5,841,886 A | 11/1998 | Rhoads |
| 5,850,481 A | 12/1998 | Rhoads |
| 5,859,920 A | 1/1999 | Daly et al. |
| 5,864,623 A | 1/1999 | Messina et al. |
| 5,905,800 A | 5/1999 | Moskowitz et al. |
| 5,907,149 A | 5/1999 | Marckini |
| 5,982,956 A | 11/1999 | Lahmi |
| 6,026,193 A | 2/2000 | Rhoads |
| 6,122,392 A | 9/2000 | Rhoads |
| 6,125,172 A | 9/2000 | August et al. |
| 6,141,438 A | 10/2000 | Blanchester |
| 6,185,683 B1 | 2/2001 | Ginter et al. |
| 6,233,684 B1 | 5/2001 | Stefik et al. |
| 6,243,480 B1 | 6/2001 | Zhao et al. |
| 6,266,430 B1 | 7/2001 | Rhoads |
| 6,272,176 B1 | 8/2001 | Srinivasan |
| 6,272,634 B1 | 8/2001 | Tewfik et al. |
| 6,285,776 B1 * | 9/2001 | Rhoads ............... 382/100 |
| 6,289,108 B1 | 9/2001 | Rhoads |
| 6,314,569 B1 | 11/2001 | Chernock et al. |
| 6,330,335 B1 | 12/2001 | Rhoads |
| 6,334,187 B1 | 12/2001 | Kadono |
| 6,343,138 B1 | 1/2002 | Rhoads |
| 6,353,672 B1 | 3/2002 | Rhoads |
| 6,363,159 B1 | 3/2002 | Rhoads |
| 6,389,151 B1 | 5/2002 | Carr et al. |
| 6,400,827 B1 | 6/2002 | Rhoads |
| 6,404,898 B1 | 6/2002 | Rhoads |
| 6,427,020 B1 | 7/2002 | Rhoads |
| 6,430,302 B2 | 8/2002 | Rhoads |
| 6,433,946 B2 | 8/2002 | Ogino |
| 6,442,285 B2 | 8/2002 | Rhoads et al. |
| 6,449,379 B1 | 9/2002 | Rhoads |
| 6,456,726 B1 | 9/2002 | Yu et al. |
| 6,463,416 B1 | 10/2002 | Messina |
| 6,496,591 B1 | 12/2002 | Rhoads |
| 6,519,352 B2 | 2/2003 | Rhoads |
| 6,522,769 B1 | 2/2003 | Rhoads et al. |
| 6,522,771 B2 | 2/2003 | Rhoads |
| 6,523,741 B1 * | 2/2003 | DiMaria et al. ............... 235/375 |
| 6,535,618 B1 | 3/2003 | Rhoads |
| 6,539,095 B1 | 3/2003 | Rhoads |
| 6,542,618 B1 | 4/2003 | Rhoads |
| 6,542,620 B1 | 4/2003 | Rhoads |
| 6,560,349 B1 | 5/2003 | Rhoads |
| 6,567,534 B1 | 5/2003 | Rhoads |
| 6,567,535 B2 | 5/2003 | Rhoads |
| 6,567,780 B2 | 5/2003 | Rhoads |
| 6,571,220 B1 | 5/2003 | Ogino et al. |
| 6,574,350 B1 | 6/2003 | Rhoads et al. |
| 6,580,819 B1 | 6/2003 | Rhoads |
| 6,587,821 B1 | 7/2003 | Rhoads |
| 6,590,997 B2 | 7/2003 | Rhoads |
| 6,591,365 B1 | 7/2003 | Cookson |
| 6,608,911 B2 | 8/2003 | Lofgren et al. |
| 6,614,914 B1 | 9/2003 | Rhoads et al. |
| 6,647,129 B2 | 11/2003 | Rhoads |
| 6,654,480 B2 | 11/2003 | Rhoads |
| 6,654,887 B2 | 11/2003 | Rhoads |
| 6,675,146 B2 | 1/2004 | Rhoads |
| 6,724,912 B1 | 4/2004 | Carr et al. |
| 6,738,495 B2 | 5/2004 | Rhoads et al. |
| 6,744,907 B2 | 6/2004 | Rhoads |
| 6,748,533 B1 | 6/2004 | Wu et al. |
| 6,750,985 B2 | 6/2004 | Rhoads et al. |
| 6,751,336 B2 | 6/2004 | Zhao |
| 6,754,377 B2 | 6/2004 | Rhoads |
| 6,757,406 B2 | 6/2004 | Rhoads |
| 6,768,808 B2 | 7/2004 | Rhoads |
| 6,771,796 B2 | 8/2004 | Rhoads |
| 6,778,682 B2 | 8/2004 | Rhoads |
| 6,785,815 B1 | 8/2004 | Serret-Avila et al. |
| 6,804,379 B2 | 10/2004 | Rhoads |
| 6,807,285 B1 | 10/2004 | Iwamura |
| 6,850,626 B2 | 2/2005 | Rhoads et al. |
| 6,882,738 B2 | 4/2005 | Davis et al. |
| 6,944,298 B1 | 9/2005 | Rhoads |
| 6,959,100 B2 | 10/2005 | Rhoads |
| 6,959,386 B2 | 10/2005 | Rhoads |
| 6,970,573 B2 | 11/2005 | Carr et al. |
| 6,978,036 B2 | 12/2005 | Alattar et al. |
| 6,983,051 B1 | 1/2006 | Rhoads |
| 6,987,862 B2 | 1/2006 | Rhoads |
| 6,990,584 B1 | 1/2006 | Yoshiura et al. |
| 6,993,152 B2 | 1/2006 | Patterson et al. |
| 7,003,132 B2 | 2/2006 | Rhoads |
| 7,003,669 B2 | 2/2006 | Monk |
| 7,054,462 B2 | 5/2006 | Rhoads et al. |
| 7,054,463 B2 | 5/2006 | Rhoads et al. |
| 7,076,084 B2 | 7/2006 | Davis et al. |
| 7,113,615 B2 | 9/2006 | Rhoads et al. |
| 7,127,744 B2 | 10/2006 | Levy |
| 7,130,087 B2 | 10/2006 | Rhoads |
| 7,181,022 B2 | 2/2007 | Rhoads |
| 7,184,570 B2 | 2/2007 | Rhoads |
| 7,239,734 B2 | 7/2007 | Alattar et al. |
| 7,242,790 B2 | 7/2007 | Rhoads |
| 7,263,203 B2 | 8/2007 | Rhoads et al. |
| 7,266,217 B2 | 9/2007 | Rhoads et al. |
| 7,269,275 B2 | 9/2007 | Carr et al. |
| 7,286,684 B2 | 10/2007 | Rhoads et al. |
| 7,305,117 B2 | 12/2007 | Davis et al. |
| 7,313,253 B2 | 12/2007 | Davis et al. |
| 7,321,667 B2 | 1/2008 | Stach |
| 7,340,076 B2 | 3/2008 | Stach et al. |
| 7,359,528 B2 | 4/2008 | Rhoads |
| 7,372,976 B2 | 5/2008 | Rhoads et al. |
| 7,415,129 B2 | 8/2008 | Rhoads |
| 7,418,111 B2 | 8/2008 | Rhoads |
| 7,424,132 B2 | 9/2008 | Rhoads |
| 7,486,799 B2 | 2/2009 | Rhoads |
| 7,499,564 B2 | 3/2009 | Rhoads |
| 7,532,741 B2 | 5/2009 | Stach |
| 7,536,555 B2 | 5/2009 | Rhoads |
| 7,539,325 B2 | 5/2009 | Rhoads et al. |
| 7,548,643 B2 | 6/2009 | Davis et al. |
| 7,555,139 B2 | 6/2009 | Rhoads et al. |
| 7,567,686 B2 | 7/2009 | Rhoads |
| 7,570,784 B2 | 8/2009 | Alattar |
| 7,602,940 B2 | 10/2009 | Rhoads et al. |
| 7,602,977 B2 | 10/2009 | Rhoads et al. |
| 7,606,390 B2 | 10/2009 | Rhoads |
| 7,639,837 B2 | 12/2009 | Carr et al. |
| 7,653,210 B2 | 1/2010 | Rhoads |
| 7,657,740 B2 * | 2/2010 | Numao et al. ............... 713/159 |
| 7,672,477 B2 | 3/2010 | Rhoads |
| 7,676,059 B2 | 3/2010 | Rhoads |
| 7,702,511 B2 | 4/2010 | Rhoads |
| 7,720,249 B2 | 5/2010 | Rhoads |
| 7,720,255 B2 | 5/2010 | Rhoads |
| 7,724,919 B2 | 5/2010 | Rhoads |
| 7,724,920 B2 | 5/2010 | Rhoads |
| 7,787,653 B2 | 8/2010 | Rhoads |
| 7,796,826 B2 | 9/2010 | Rhoads et al. |
| 7,831,062 B2 | 11/2010 | Stach |
| 7,941,534 B2 * | 5/2011 | de la Huerga ............... 709/225 |
| 2001/0022848 A1 | 9/2001 | Rhoads |
| 2001/0024510 A1 | 9/2001 | Iwamura |
| 2002/0009208 A1 | 1/2002 | Alattar et al. |
| 2002/0018579 A1 | 2/2002 | Rhoads et al. |
| 2002/0026587 A1 | 2/2002 | Talstra et al. |
| 2002/0028000 A1 | 3/2002 | Conwell et al. |
| 2002/0072982 A1 | 6/2002 | Barton et al. |
| 2002/0080994 A1 | 6/2002 | Lofgren et al. |
| 2002/0080995 A1 | 6/2002 | Rhoads |
| 2002/0090112 A1 | 7/2002 | Reed et al. |
| 2002/0106082 A1 | 8/2002 | Kori et al. |
| 2002/0126869 A1 | 9/2002 | Wang et al. |
| 2002/0136429 A1 | 9/2002 | Stach et al. |
| 2002/0150246 A1 | 10/2002 | Ogino |
| 2002/0166050 A1 | 11/2002 | Takahashi |
| 2002/0194492 A1 | 12/2002 | Choi et al. |
| 2003/0021440 A1 | 1/2003 | Rhoads |

| | | |
|---|---|---|
| 2003/0077096 A1 | 4/2003 | Potter et al. |
| 2003/0138128 A1 | 7/2003 | Rhoads |
| 2004/0057581 A1 | 3/2004 | Rhoads |
| 2004/0181671 A1 | 9/2004 | Brundage et al. |
| 2004/0223626 A1 | 11/2004 | Honsinger et al. |
| 2004/0263911 A1 | 12/2004 | Rodriguez |
| 2005/0160271 A9 | 7/2005 | Brundage et al. |
| 2006/0028689 A1 | 2/2006 | Perry et al. |
| 2006/0062386 A1 | 3/2006 | Rhoads |
| 2007/0172098 A1 | 7/2007 | Rhoads |
| 2007/0180251 A1 | 8/2007 | Carr |
| 2007/0201835 A1 | 8/2007 | Rhoads |
| 2008/0131083 A1 | 6/2008 | Rhoads |
| 2008/0131084 A1 | 6/2008 | Rhoads |
| 2008/0149713 A1 | 6/2008 | Brundage |
| 2008/0253740 A1 | 10/2008 | Rhoads |
| 2008/0275906 A1 | 11/2008 | Brundage |
| 2009/0252401 A1 | 10/2009 | Davis et al. |
| 2010/0008534 A1 | 1/2010 | Rhoads |
| 2010/0008536 A1 | 1/2010 | Rhoads |
| 2010/0008537 A1 | 1/2010 | Rhoads |
| 2010/0021004 A1 | 1/2010 | Rhoads |
| 2010/0027969 A1 | 2/2010 | Alattar |
| 2010/0040255 A1 | 2/2010 | Rhoads |
| 2010/0119108 A1 | 5/2010 | Rhoads |
| 2010/0131767 A1 | 5/2010 | Rhoads |
| 2010/0142752 A1 | 6/2010 | Rhoads et al. |
| 2010/0146285 A1 | 6/2010 | Rhoads et al. |
| 2010/0163629 A1 | 7/2010 | Rhoads et al. |
| 2010/0172538 A1 | 7/2010 | Rhoads |

FOREIGN PATENT DOCUMENTS

| | | |
|---|---|---|
| EP | 0961239 | 12/1999 |
| WO | WO96/03286 | 2/1996 |
| WO | WO96/36163 | 11/1996 |
| WO | WO99/36876 | 7/1999 |
| WO | WO01/69518 | 9/2001 |
| WO | WO0209019 | 1/2002 |
| WO | WO0211446 | 2/2002 |
| WO | WO02056264 | 7/2002 |
| WO | WO02059712 | 8/2002 |

OTHER PUBLICATIONS

U.S. Appl. No. 08/215,289, filed Mar. 17, 1994, Geoffrey B. Rhoads.
U.S. Appl. No. 09/150,147, filed Sep. 9, 1998, Geoffrey B. Rhoads.
U.S. Appl. No. 09/151,492, filed Sep. 11, 1998, Bruce L. DavisV.
U.S. Appl. No. 09/496,380, filed Feb. 2, 2000, Geoffrey B. Rhoads.
U.S. Appl. No. 12/881,911, filed Sep. 14, 2010, Geoffrey B. RhoadsV.

* cited by examiner

Watermark tiling patterns may be misaligned

X-translation of watermarked window

Y-translation of watermarked window

IDENTIFICATION DOCUMENT AND RELATED METHODS

RELATED APPLICATION DATA

This application is a continuation of U.S. patent application Ser. No. 10/686,495, filed Oct. 14, 2003 (published as US 2004-0181671 A1 and US 2005-0160271 A9). The Ser. No. 10/686,495 also claims the benefit of U.S. Provisional Patent Application Nos. 60/421,254, filed Oct. 25, 2002, 60/494,709, filed Aug. 12, 2003, 60/495,236, filed Aug. 13, 2003 and 60/495,373, filed Aug. 14, 2003. Each of these patent documents is hereby incorporated herein by reference.

The Ser. No. 10/686,495 application is also related to U.S. patent application Ser. No. 10/011,129, filed Nov. 9, 2001 (now U.S. Pat. No. 6,970,573), which is a continuation of U.S. patent application Ser. No. 09/442,780, filed Nov. 18, 1999 (now U.S. Pat. No. 6,389,151). The Ser. No. 09/442,780 application claims benefit to U.S. Provisional Application No. 60/109,259, filed Nov. 19, 1998.

This application is also related to assignee's U.S. patent application Ser. Nos. 09/945,244, filed Aug. 31, 2001 (published as 20020057823 A1), 09/503,881 (now U.S. Pat. No. 6,614,914), 09/452,023 (now U.S. Pat. No. 6,408,082), 10/366,541, filed Feb. 12, 2003 (published as US 2003-0179903 A1), 09/433,104, filed Nov. 3, 1999 (allowed), 10/032,282, filed Dec. 20, 2001 (published as US 2002-0114491 A1), and 09/498,223, filed Feb. 3, 2000 (now U.S. Pat. No. 6,574,350), 60/418,762, filed Oct. 15, 2002, and U.S. Pat. No. 6,389,151. The Ser. No. 10/366,541 application is a grandchild of assignee's U.S. Pat. No. 5,841,886. This application is also related to assignee's concurrently filed U.S. patent application Ser. No. 10/686,547 (published as US 2004-0158724 A1). Each of these patent documents is herein incorporated by reference.

FIELD OF THE INVENTION

The present invention relates to authenticating and securing identification documents through digital watermarking.

BACKGROUND AND SUMMARY OF THE INVENTION

The use of identification documents is pervasive. Identification documents are used on a daily basis—to prove identity, to verify age, to access a secure area, to evidence driving privileges, to cash a check, and so on. Airplane passengers are required to show an identification document during check in, and sometimes at security screening and prior to boarding their flight. We also live in an ever-evolving cashless society. Identification documents are used to make payments, access an automated teller machine (ATM), debit an account, or make a payment, etc. Many industries require that their employees carry photo ID on the job.

For the purposes of this disclosure, identification documents are broadly defined and may include, e.g., credit cards, bank cards, phone cards, passports, driver's licenses, network access cards, employee badges, debit cards, security cards, visas, immigration documentation, national ID cards, citizenship cards, social security cards, security badges, certificates, identification cards or documents, voter registration cards, police ID cards, border crossing cards, legal instruments or documentation, security clearance badges and cards, gun permits, gift certificates or cards, labels or product packaging, membership cards or badges, etc., etc. Also, the terms "document," "card," and "documentation" are used interchangeably throughout this patent document. Identification documents are also sometimes interchangeably referred to as "security documents," "ID documents," "photo-IDs" and "photo ID documents".

With reference to FIG. 1, an identification document 10 includes a "card-shaped" substrate 21, historically made from a material such as paper or plastic, but now even made from synthetics such as Teslin®. (Teslin® is available from PPG Industries, One PPG Place, Pittsburgh, Pa. 15272 USA). Identification document 10 includes a photograph 14 and various data 12, e.g., such as textual information, graphics, a screened-back or hidden image, bar codes, biometric information (e.g., a fingerprint), text information (e.g., name, address, birth date, ID number, etc.), or the like. Of course both sides of substrate 21 can receive printing or engraving. Other suitably interchangeable features and materials are found, e.g., in assignee's U.S. patent application Ser. No. 10/330,032, filed Dec. 24, 2002 (published as US 2003-0173406 A1), which is herein incorporated by reference.

The printed substrate 21 is usually laminated. The laminate typically includes a plastic, polyester or polycarbonate-based top sheet 23 and bottom sheet 25 that respectively overlay the top and bottom of the substrate 21. Heat and/or adhesives and pressure are used to bond the laminate sheets 23 and 25 with the substrate 21. Or a laminate can include a pouch into which the substrate 21 slips. Again, heat and/or adhesives and pressure are used to bond the substrate 21 with a pouch laminate. The laminates provide a protective covering for the printed substrate and provide a level of protection against unauthorized tampering. (For example, a laminate would have to be removed to alter the printed information and then subsequently replaced after the alteration.). A laminate layer 23 or 25 may optionally carry information like a card bearer's signature or security features.

In some implementations, information may also be optically or magnetically stored on recording media (e.g., magnetic stripe 27, or optical memory or electronic circuitry—not shown in FIG. 1) carried by the laminate 25. Of course the recording media can be alternatively carried by substrate 21 or laminate 23.

We note that the present invention encompasses ID documents including more or less features and layers than are illustrated in FIG. 1. Additional features may include graphics printed in dual color optically variable ink, microprinting text, so-called "ghost images," information and images printed in UV inks, and security features such as those disclosed in, e.g., assignee's U.S. patent application Ser. No. 10/170,223 (published as US 2003-0031340 A1), which is herein incorporated by reference.

Identification documents can also include information such as a bar code (e.g., which may contain information specific to the person whose image appears in the photographic image, and/or information that is the same from ID document to ID document), variable personal information (e.g., such as an address, signature, and/or birth date, biometric information associated with the person whose image appears in the photographic image, e.g., a fingerprint), a magnetic stripe (which, for example, can be on the a side of the ID document that is opposite a side with a photographic image), and various security features (e.g., a security pattern like a printed pattern comprising a tightly printed pattern of finely divided printed and unprinted areas in close proximity to each other, such as a fine-line printed security pattern as is used in the printing of banknote paper, stock certificates, and the like). Of course, an identification document can include more or less features.

Another example of an identification document is one including a core layer (which can be pre-printed), such as a light-colored, opaque material, e.g., TESLIN, which is available from PPG Industries) or polyvinyl chloride (PVC) material. The core can be laminated with a transparent material, such as clear PVC to form a so-called "card blank". Information, such as variable personal information (e.g., photographic information, address, name, document number, etc.), is printed on the card blank using a method such as Dye Diffusion Thermal Transfer ("D2T2") printing (e.g., as described in commonly assigned U.S. Pat. No. 6,066,594, which is herein incorporated by reference), laser or ink jet printing, offset printing, etc. The information can, for example, comprise an indicium or indicia, such as the invariant or nonvarying information common to a large number of identification documents, for example the name and logo of the organization issuing the documents. Any known process capable of forming the indicium may be used to form the information.

To protect the information that is printed, an additional layer of transparent overlaminate can be coupled to the card blank and printed information, as is known by those skilled in the art. Illustrative examples of usable materials for overlaminates include biaxially oriented polyester or other optically clear durable plastic film.

Of course, there are many other identification documents that include different structures, features and materials. These other identification documents can be suitably interchanged with the identification documents described herein. The inventive digital watermarking techniques disclosed herein will similarly benefit these other documents as well.

An identification document may include a digital watermark. Digital watermarking is a process for modifying physical or electronic media to embed a machine-readable code into the media. The media may be modified such that the embedded code is imperceptible or nearly imperceptible to the user, yet may be detected through an automated detection process. In some of our preferred embodiments, an identification document includes two or more digital watermarks.

Digital watermarking systems typically have two primary components: an encoder that embeds the digital watermark in a host media signal, and a decoder that detects and reads the embedded digital watermark from a signal suspected of containing a digital watermark (a suspect signal). The encoder embeds a digital watermark by altering the host media signal. The alterations usually take the form of altered signal values, such as slightly changed pixel values, luminance, colors, changed DCT coefficients, altered signal values or selective placement or signal tweaks, etc. However, a watermark can also be manifested in other ways, such as changes in the surface microtopology of a medium, localized chemical changes (e.g. in photographic emulsions), localized variations in optical density, localized changes in luminescence, etc. The surface texture of an object may be altered to create a watermark pattern. This may be accomplished by manufacturing an object in a manner that creates a textured surface or by applying material to the surface (e.g., an invisible film or ink) in a subsequent process. The watermark reading component analyzes content to detect whether a watermark pattern is present. In applications where the watermark encodes information, the reading component extracts this information from the detected watermark. The reading component analyzes a suspect signal to detect whether a digital watermark is present. The reading component can be hosted on a wide variety of units ranging from tethered or wireless reader devices, conventional personal computers, network servers, cell phones including cameras, to fully mobile readers with built-in displays. Image data corresponding to a watermarked surface of an identification document is read and decoded by this reader to obtain a watermark's information or "payload".

Several particular digital watermarking techniques have been developed. The reader is presumed to be familiar with the literature in this field. Some techniques for embedding and detecting imperceptible watermarks in media signals are detailed in assignee's U.S. Pat. No. 6,614,914, U.S. Pat. No. 6,122,403 and PCT patent application PCT/US02/20832 (published in English as WO 03/005291), which are each herein incorporated by reference.

In assignee's U.S. Pat. No. 5,841,886 techniques and methods are disclosed to detect alteration of photo ID documents, and to generally enhance the confidence and security of such systems. In this regard, reference is made to FIG. 2, which depicts a photo-ID card or document 1000 which may be, for example, a passport or visa, driver's license, credit card, government employee identification, or a private industry identification badge. For convenience, such photograph-based identification documents will be collectively referred to as photo ID documents.

The photo ID document includes a photograph 1010 that is attached to the document 1000. Printed, human-readable information 1012 is incorporated in the document 1000, adjacent to the photograph 1010. Machine-readable information, such as that known as "bar code" may also be included adjacent to the photograph. Generally, the photo ID document is constructed so that tampering with the document (for example, swapping the original photograph with another) should cause noticeable damage to the card. Nevertheless, skilled forgers are able to either alter existing documents or manufacture fraudulent photo ID documents in a manner that is extremely difficult to detect. Security associated with the use of photo ID documents is enhanced by supplementing the photographic image with encoded information (which information may or may not be visually perceptible), thereby facilitating the correlation of the photographic image with other information concerning the person, such as the printed information 1012 appearing on the document 1000.

A photograph 1010 may be produced from a raw digital image to which is added a master snowy image as described in U.S. Pat. No. 5,841,886. A central network and point-of-sale reading device (which device, in the present embodiment, may be considered as a point-of-entry or point-of-security photo ID reading device), would essentially carry out the same processing as described with that embodiment, including the central network generation of unique numbers to serve as indices to a set of defined orthogonal patterns, the associated dot product operation carried out by the reader, and the comparison with a similar operation carried out by the central network. If the numbers generated from the dot product operation carried out by the reader and the central network match, in this embodiment, the network sends the OK to the reader, indicating a legitimate or unaltered photo ID document.

It will be appreciated that the information encoded into the photograph may correlate to, or be redundant with, the readable information 1012 appearing on the document. Accordingly, such a document could be authenticated by placing the photo ID document on a scanning system, such as would be available at a passport or visa control point. The local computer, which may be provided with the universal code for extracting the identification information, displays the extracted information on the local computer screen so that the operator is able to confirm the correlation between the encoded information and the readable information 1012 carried on the document. It will be appreciated that the information encoded with the photograph need not necessarily correlate with other information on an identification document. For example, the scanning system may need only to confirm the existence of the identification code so that the user may be provided with a "go" or "no go" indication of whether the photograph has been tampered with. It will also be appreciated that the local computer, using an encrypted digital communications line, could send a packet of information to a central verification facility, which thereafter returns an encrypted "go" or "no go" indication.

In another implementation of the '886 patent, it is contemplated that the identification code embedded in the photograph may be a robust digital image of biometric data, such as a fingerprint of the card bearer, which image, after scanning and display, may be employed for comparison with the actual fingerprint of the bearer in very high security access points where on-the-spot fingerprint recognition systems (or retinal scans, etc.) are employed.

We disclose herein methods, systems and identification document to improve or provide alternative techniques for confronting fraudulent use of identification documents. Fraudulent use of identification documents may occur where, for example, an otherwise legitimate identification document is modified such that the original photograph is swapped with that of another person, thereby enabling the other person to masquerade, at least temporarily, under the guise of the original identification document holder.

Even in the absence of photo swapping or alteration, it is oftentimes difficult to confirm by inspection that the individual depicted in the photograph of the identification card is indeed the bearer of the card.

One aspect of this invention provides enhanced security and certainty in the use of photo identification documents.

Another aspect provides methods and systems for authenticating and securing identification documents using multiple digital watermarks or multiple watermark components.

According to still another aspect of the present invention, a security document includes a substrate and a first graphic carried by the substrate. The first graphic conveys a photographic image to human viewers thereof, and the first graphic is steganographically encoded to convey first plural bits of data recoverable by computer analysis of the first graphic. The security document also includes a second graphic carried by the substrate. The second graphic conveys a visual image to human viewers thereof, and the second graphic is steganographically encoded to convey second plural bits of data recoverable by computer analysis of said second graphic. The steganographically encoded first plural bits of data and the steganographically encoded second plural bits of data cooperate to verify authenticity of the security document.

According to still another aspect of the invention, a method is provided to detect swapping of first artwork from a first identification document with second artwork on a second identification document. The swapping results in the first artwork being carried on the second identification document instead of the second artwork. The first artwork includes a first digital watermark embedded therein, and the second identification document includes a second digital watermark embedded in a first region. The method includes: receiving scan data associated with at least a portion of the first artwork and at least a portion of the first region; analyzing the scan data to detect the first digital watermark and the second digital watermark; and comparing the first digital watermark with the second digital watermark to detect swapping of the first artwork with the second artwork.

Another aspect of the present invention is a security document including a substrate and a first graphic carried by the substrate. The first graphic conveys a photographic image to human viewers thereof, and the first graphic is steganographically encoded to convey first plural bits of digital data recoverable by computer analysis of said first graphic. The security document also includes a second graphic, the second graphic conveying a visual image to human viewers thereof. The security document also includes a detection trigger. The detection trigger serves to indicate a presence of steganographic encoding. The second graphic is steganographically encoded to convey second plural bits of digital data recoverable by computer analysis of said second graphic, wherein the steganographically encoded first plural bits of digital data and the steganographically encoded second plural bits of digital data cooperate to verify authenticity of the security document.

Still another aspect of the present invention is a method of identifying a first area and a second area of a printed document that are likely to include, respectively, a first digital watermark and a second digital watermark. The first digital watermark includes a first orientation component and the second digital watermark includes a second orientation component. The method includes receiving optically scanned image data that corresponds with at least a portion of the printed document; segmenting the image data into a plurality of image portions; determining an orientation measure relative to a predetermined orientation for each of the image portions; identifying the first area by associating image portions having a first orientation measure; and identifying the second area by associating image portions having a second orientation measure Additional features, aspects and advantages of the present invention will become even more apparent with reference to the following detailed description and accompanying drawings.

DETAILED DESCRIPTION

Introduction

Figure 1:
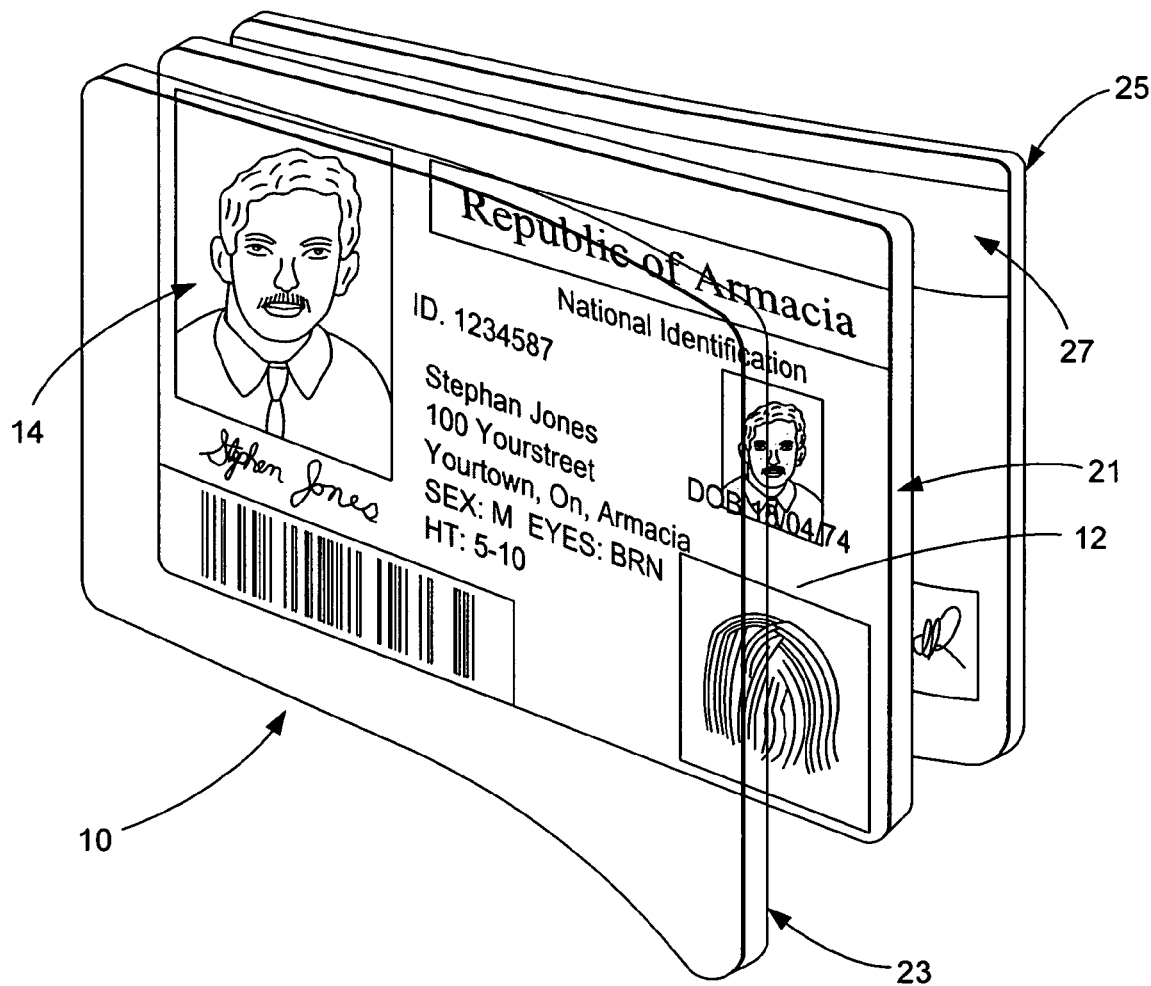
FIG. 1 illustrates an identification document.
Figure 2:
FIG. 2 illustrates another identification document.

The following detailed description is grouped into four main sections. The grouping is not meant to limit the scope of the present invention, and is merely provided for the reader's convenience. Indeed, we anticipate that disclosed methods, systems and identification documents found under one section heading can be readily combined with methods, systems and identification documents under other section headings. The main sections include: i) Authenticating Identification Documents with Digital Watermarks; ii) Advantages of Watermarking Identification Documents; iii) Detecting Media Areas Likely of Hosting Watermarks; and iv) Introduction to Appendix A.

Authenticating Identification Documents with Digital Watermarks

First Embodiment

Forensics and Proof of Compliance

As discussed above with respect to our '886 patent, a photo-ID can be enhanced through embedding data therein. Data can be embedded in, e.g., a graphic or background of the photo-ID. More preferable, however, is to embed the data in a photograph image. The watermark is preferably robust, in that it survives scanning and printing. In some implementations of this embodiment, the watermark is repeated or redundantly embedded throughout an image or document.

Although sometimes redundantly embedded across an entire document surface, a watermark can be embedded in a particular region of the document if desired (e.g., only in a photograph or a graphic). In an area-based embedding implementation, we can use a mask to identify areas for embedding (or areas that will not receive embedding). The watermark is embedded in identified areas (or is embedded to avoid areas). The watermark can also include a so-called orientation component. An orientation component is helpful in resolving issues of image distortion such as scaling, rotation, translation, etc. In some cases the orientation component comprises a separate digital watermark.

A digital watermark can be used to provide a machine-readable means to detect fraud due to photo swapping and so-called card "simulation." The watermark preferably includes a payload or message. The message, once decoded, can be used to provide a visual check for alterations. The decoded message or payload can be displayed, e.g., via a graphical user interface, for use by an inspector or law enforcement officer. For example, if the payload includes the cardholder's date of birth, the payload date of birth can be checked against the corresponding date of birth as printed on the photo-ID. The crosscheck can even be automated. The payload information can include additional information such as driver's license number, jurisdiction code (e.g., code or text indicating which state, agency or company issued the photo-ID), personal information (address, age, sex, weight, height, etc.), driver's insurance information (or a link thereto), unique identifier, etc.

An advantage of this implementation is that if a watermarked photograph is copied onto another photo-ID document, the watermark provides a telltale sign pointing to the originating card. Once a watermark photograph is determined to be non-compliant with the text or information provided on the document, e.g., the payload data does not correspond with the printed or stored information, the payload can be used to identify the originating document—providing a forensic tracking mechanism. (If the payload includes the originating driver's license number or other unique identifier, such payload information can be used to positively identify the originating document.).

Another advantage of this implementation is that a machine record for inspecting the photo-ID can be used as a "proof of compliance" or proof of identification inspection. To facilitate such, the watermarked photo-ID is presented to an optical sensor. The optical sensor captures an image of the photo-ID and produces scan data corresponding to such. A watermark detector analyzes the scan data to find and decode the digital watermark embedded in the photo-ID. The detector obtains the payload (e.g., a unique identifier or driver's license number) and a check for the correspondence between the payload and information carried by the card is made. The payload can be stored in a repository or list to evidence that the photo-ID was checked or inspected.

In an optional implementation of this embodiment, the payload is cross-related to information carried in a magnetic stripe on the card. Validating the card then requires two reads—one an optical read of the watermark on the face of the card, and a swipe of the magnetic stripe through a magnetic-stripe reader. The magnetic stripe information is decoded and compared with the watermark payload. This implementation has the benefit of locking the watermarked information to the magnetic stripe, but it requires an additional read (e.g., for the magnetic stripe) of the card.

Second Embodiment

Multiple Watermarks

Additional security is added to an identification document by providing first and second digital watermarks on the identification document. For example, a first digital watermark is embedded in first region of the identification document like in a photograph, artwork, graphic, seal, or image (e.g., ghost image). And a second digital watermark is provided in a second region of the identification card. For example, the second digital watermark is embedded in a background pattern or tint, line-art (see, e.g., assignee's U.S. Pat. No. 6,449,377) or in text, artwork, seal, images or graphics carried by the identification document. The first and second watermarks also may include a so-called orientation component. An orientation component is helpful to resolve image distortion such as rotation, scale and translation. (We note that the second watermark can be embedded using the same or different embedding protocol as the first watermark.). Although not necessary, the first and second watermarks are preferably redundantly embedded or tiled in their respective embedding regions.

The first digital watermark preferably includes a first payload or first message bits carrying or relating to a first set of information, and the second digital watermark preferably includes a second payload or second message bits carrying or relating to a second set of information. The payloads may include plural-bit payload structure. The payloads can have fixed and variable portions and/or error correction bits. In some cases a payload will include a checksum or error bits to ensure the validity of a payload or a cross-correlation between the watermark payloads. Examples of watermark payloads are shown, e.g., in assignee's U.S. Published patent application Ser. No. 10/193,719, filed Jul. 10, 2002 (published as US 2003-0033530 A1) and in U.S. Pat. No. 6,614,914. Each of these patent documents is herein incorporated by reference.

The first set of information preferably relates to the holder of the identification card (hereafter "cardholder") and/or to the issuing authority (e.g., state DMV or company) or jurisdiction. For example, the first set of information may include "related information" such as a unique identifier that is associated with the issuer or cardholder, a date of birth, jurisdiction code, identification document number, name, address, physical characteristics (hair color, weight, biometric, sex, etc.), issue date, restrictions (e.g., age restrictions, driving limitations, etc.), a hash (e.g., a reduced-bit representation) of such related information, and/or a combination of the above related information.

The second set of information, which is carried by or related to the second payload, preferably corresponds with the first set of information. The term "corresponds" in this context is used broadly and may range, e.g., from an exact match to a loose association within a predetermined tolerance.

In a first implementation, the second set of information corresponds exactly with the first set of information. The sets of information are compared to determine authenticity. In a second implementation, the second set of information includes a subset of the first set of information. The subset is cross-correlated with the first set of information to determine authenticity. In another implementation, the first set of information includes a key to decrypt the second set of information (or vise versa). (We note that an encrypted watermark payload may optionally be decrypted with a key contained in a watermark detector.). In still another implementation, the second set of information includes at least some information that should correspond with information carried by a magnetic stripe or barcode (see a related discussion under the First Embodiment, above). In yet another implementation, the second set of information includes both a subset of the first information and additional information. For example, the subset may include the birth date and document number, while the additional information may correspond with text printed on the document. Or the subset may include simply the document number (or portion thereof), or the bearer's birth date and date of issue. Of course, many other combinations of related information can be provided. For example, the sets of information may be targeted to detect an age or name alteration (e.g., by including age or name information in one or both of the sets of information). In some cases the sets of information includes hashes or reduced bit representations of information pertaining to the cardholder or printed text information. One hash, perhaps a hash carried by the second set of information, may even represent some or all of the first set of information. In still other implementations a document number is distributed between the first and second sets of information. For example, the first set of information includes a first part of the document number and the second set of information includes the remaining portion of the document number. A checksum or error bit can be included with the first or second sets of information to ensure that the document number portions correspond in the expected manner.

To authenticate an identification document including two digital watermarks, a watermark detector reads both watermarks. The first set of information and the second set of information are retrieved from their respective watermark payloads. (We note that typically only one optical scan is needed to generate scan data, from which both the first and second watermarks are detected from, when the first and second watermarks are provided on the same surface of the identification document.). The first and second sets of information are compared to determine a correspondence. If a correspondence occurs, some or all of the watermark information may be provided to an inspector to facilitate a further check against text alteration. For example, both the date of birth and some data to verify against printed text (e.g., an indication that the $3^{rd}$ letter of the first name should be "e", and the $2^{nd}$ letter of the last name should be "t") can be provided to the inspector. Or, in other implementations, a signal is generated to indicate the authenticity of the identification document.

Figure 3A:
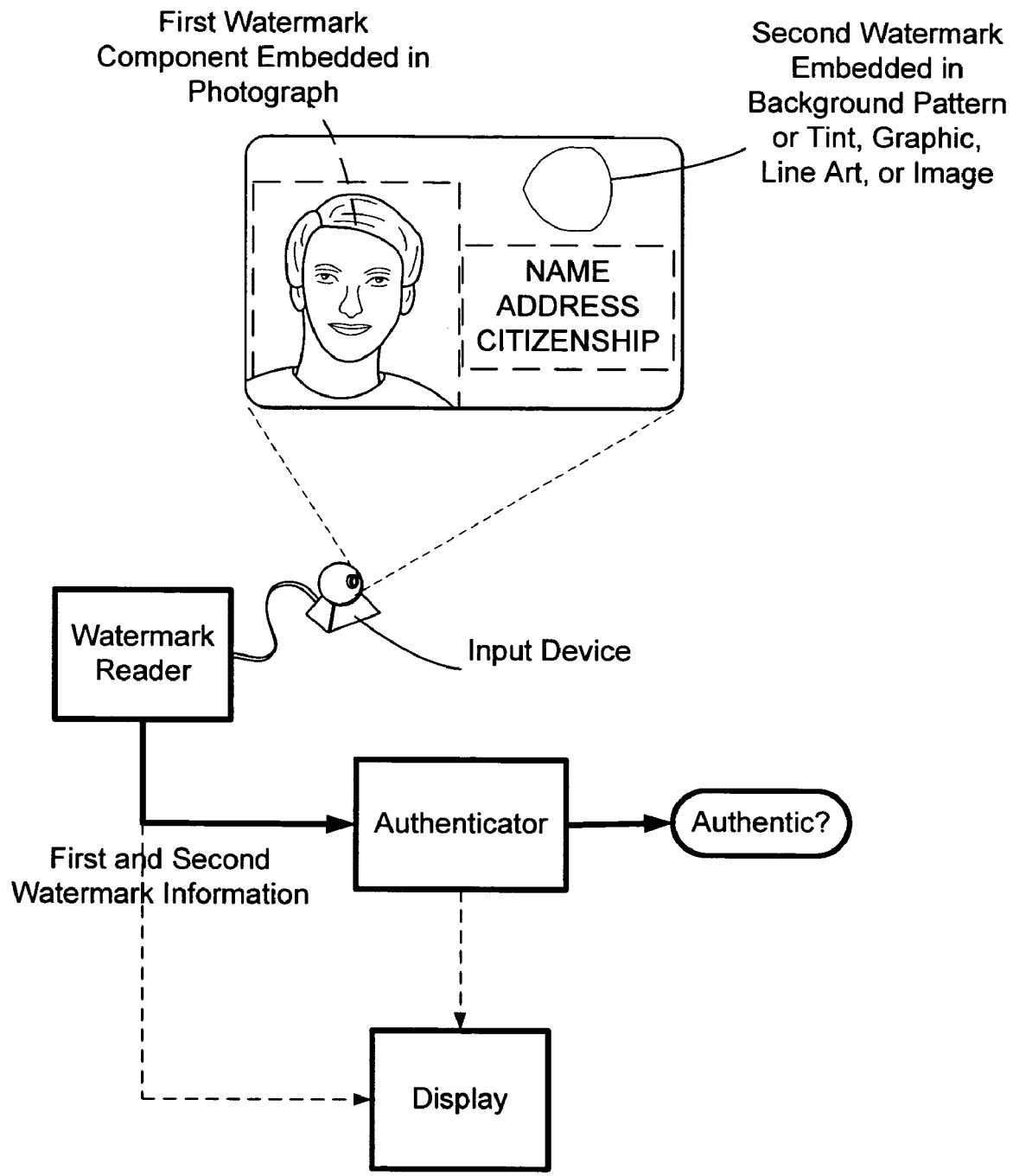
FIG. 3A is a diagram illustrating an authenticating method according to one aspect of the present invention.
Figure 3B:
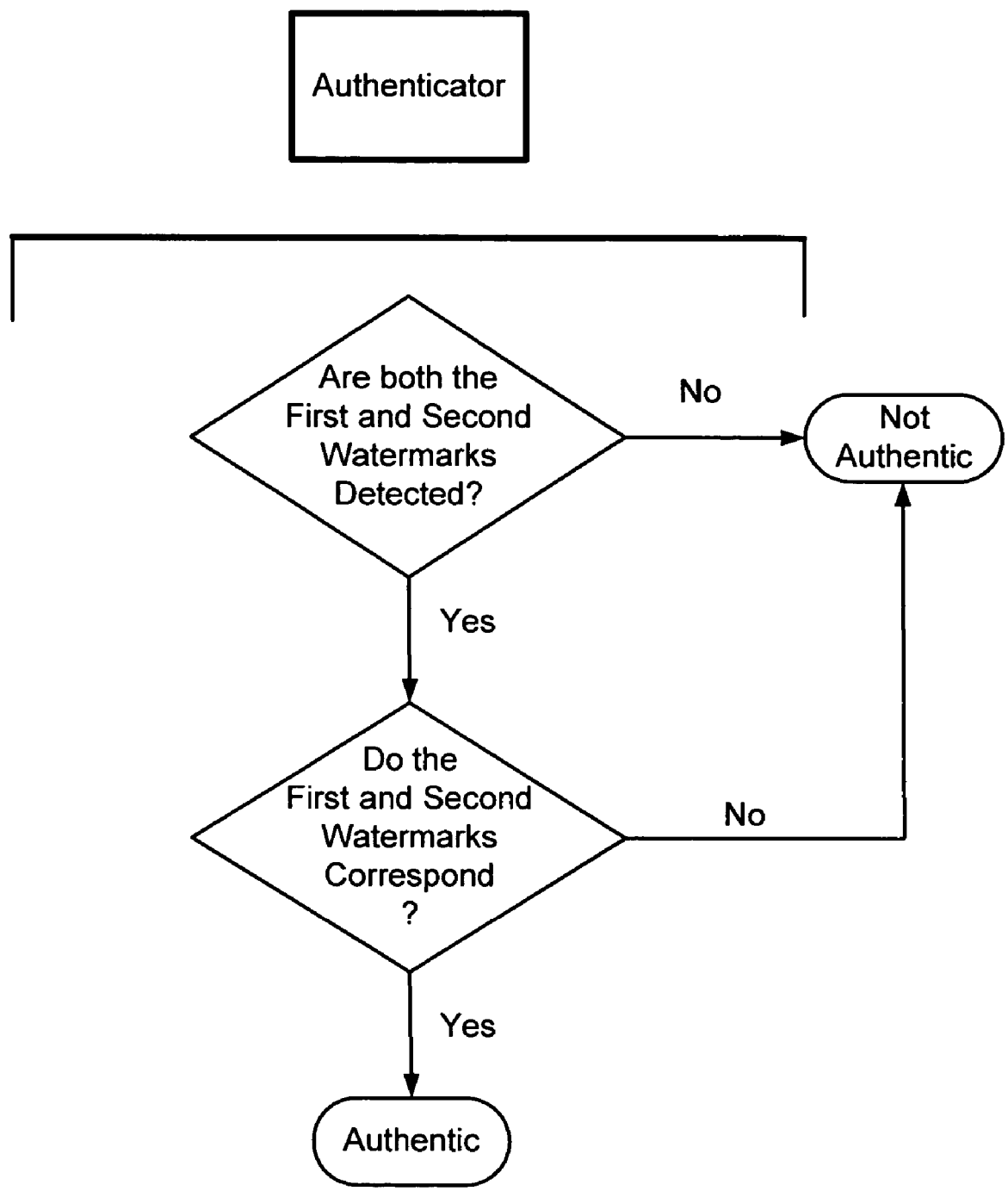
FIG. 3B is a flow diagram illustrating an authenticating aspect of the FIG. 3A diagram.

FIGS. 3A and 3B are diagrams illustrating another authentication technique for an identification document including digital watermarking. An input device captures an image of an identification document. The identification document includes first and second digital watermarks. The input device conveys data corresponding to a captured image to a watermark reader. The watermark reader can be realized as a programmable computer, which executes software instructions to detect and decode the first and second digital watermarks included in the captured image data. The computer can include a handheld device, laptop, desktop or remote server. (While the input device is illustrated as being tethered to the watermark detector/computer, this aspect of the present invention also contemplates that the input device can wirelessly communicate with the computer or communicate via a network instead. The input device may also be incorporated with the reader, e.g., as in a camera cell phone.). The watermark reader passes decoded watermark information (e.g., payload or message information) to the authenticator. The authenticator can also be realized by software executing on a computer, and in some implementations, the watermark reader includes the authenticator module. The authenticator module determines whether the first and second watermark information corresponds. This determination, in some implementations, involves a crosscheck between a first subset (e.g., birth date) from the first watermark and a first subset from the second watermark (e.g., birth date). In other implementations the authentication determination involves multiple crosschecks between the first and second watermarks. For example, a first subset (e.g., birth date) carried by the first watermark is compared against a first subset (e.g., birth date) of the second watermark, and a second subset (e.g., document number or a portion thereof) of the first watermark is compared against a second subset (e.g., document number or a hash of the document number) of the second digital watermark.

In an alternative implementation, the authenticator (or watermark reader) passes all or a portion of the watermark information to a computer display (e.g., a computer graphical user interface). Displaying some or all of the watermark information allows an inspector or officer to visually compare the watermark information against information printed on the document. The authenticator outputs an authentication signal to indicate the authentication status of the identification document. In some cases the signal is conveyed to the display. Here, the authentication signal can be a simple pass or fail signal, or a more detailed response indicating the reason for the failure (e.g., one watermark found but the second one is undetectable). In other cases the signal is conveyed to an audio output device (e.g., audio speaker) to audibly signal the authentication status (e.g., a predetermined sound or audio segment is output if authentic, while another predetermined sound or audio segment is output is not authentic). In other implementations a fail signal is used to trigger a secondary process. For example, a fail signal is used to spawn a process to obtain additional data from the identification document. The additional data can be retrieved from optical scan data (e.g., OCR, barcode, or image data for another watermark detection attempt), optical or electronic memory, or manual input. The additional data can be used, e.g., to: i) verify watermark detection failure; ii) authenticate the document through a non-watermarking process; and/or iii) trigger a forensic analysis of the identification document.

The authenticator module is further discussed with reference to FIG. 3B. The identification document is preferably considered authentic when both the first and second digital watermarks are recovered and when the first and second watermark information (e.g., sets of information) correspond. The document is considered not authentic when either of these criteria is not met. Of course, as discussed above, a watermark detection failure may be used to trigger another process, like a non-watermark based authentication process.

We note that the second embodiment of this section is generally issuing source and document neutral. This means that a first and second digital watermark is used to verify an identification document regardless of the features provided on the card. Although document neutral, interpretation of the payload bits can vary according to issuer identification. To illustrate, consider a first employee badge issued by a first company and a second employee badge issued by a second company. Each of the first and second employee badges include first and second watermarks embedded therein. All four of the watermarks (i.e., two from the first badge and two from the second badge) have, e.g., a 72-bit payload. The watermarks include a subset of bits (e.g., 4-12 bits) to designate which company issued the badges or to which company the badges are associated with (e.g., an issuer or client code). The bits are located in a predetermined payload location, so that a detector or an application cooperating with the detector can grab the subset of bits and make a determination of who issued the badge. The watermark detector (or a cooperating software application) interprets the bits as designated for the particular issuer or client. For example, the detector or application can query a data structure, branch into a predetermined block of software code, or interrogate a look-up-table to decide what the bits correspond to. (For example, for issuer "Ace," a private toolmaker, the first 10 bits are the issuer code, the next 32 bits represent a document number, the next 10 bits represent an issue date or birth date and the last 20 bits represent error correction bits or checksums. And, for "Beta," a government agency, documents associate with Beta include a payload with the first 10 bits representing the issuer code, the next 20 bits represent a document number, the next 20 represent a security clearance, the next 10 represent an issue date and the last 10 represent error correction bits or checksums.). A watermark may similarly carry data (or a signal feature) to indicate that it is a first or second watermark, or an image frame location indicating where a watermark is located is used to distinguish between a first and second watermark. The payloads fields can be designated or interpreted differently for each of the first and second watermarks, even for watermarks issued by the same issuer.

As an alternative implementation of the second embodiment, a second digital watermark is provided on a different document surface than is the first digital watermark (e.g., the back side of the document). We note that this alternative implementation may require two optical scans to detect both the first and second digital watermarks. This may be less of an issue when the second digital watermark includes information that is used for forensic tracking purposes. For example, the watermark may include information that is tied to the original cardholders. If the second watermark is copied and transferred to a second identification document, the watermark information can be used to trace back to the original cardholder. Similarly, the second watermark may include information pertaining to the issuing location (e.g., which DMV branch office) or original issuing officer.

A few illustrative combinations are shown below. Of course, these combinations are not meant to limit the scope of this aspect of the invention. Rather, the combinations are provided by way of example only.

A1. A method to authenticate an identification document, the identification document comprising a first digital watermark and a second digital watermark, said method comprising the steps of:
  receiving an optically captured image of at least a portion of the identification document;
  analyzing the optically captured image to detect the first and second digital watermarks;
  if either of the first or second digital watermarks is not detected, determining that the identification document is not authentic; and
  if both of the first and second digital watermarks are detected, comparing the first and second digital watermarks to determine if they correspond.

A2. The method of combination A1, further comprising the step of displaying through a computer based graphical user interface at least a portion of information carried by either the first or second digital watermark, and comparing the displayed information with text printed on the identification document.

A3. The method of combination A1, wherein the document comprises text printed thereon, and at least a portion of information carried by the first and second digital watermark corresponds to the printed text.

A4. The method of combination A1, wherein the first digital watermark includes a first plural bit message, and the second digital watermark includes a second plural bit message.

A5. The method of combination A4, wherein said comparing of the first and second digital watermarks to determine if they correspond comprises comparing at least a portion of the first message with at least a portion of the second message.

A6. The method of combination A6, wherein at least one of the first message and the second message includes an issuer code, wherein said combination further comprises interpreting the plural bits of at least one of the first message and the second message according to a predetermined format associated with the issuer code.

A7. The method of combination A4, wherein the first message comprises a first subset and a second subset, and wherein the second message comprises a third subset and a fourth subset.

A8. The method of combination A7, wherein said comparing of the first and second digital watermarks to determine if they correspond comprises comparing the first subset with the third subset and comparing the second subset with the fourth subset.

A9. The method of combination A8, wherein said first subset and third subset comprise redundant information.

A10. The method of combination A8, wherein said first subset and third subset comprise corresponding information.

A11. The method of combination A9, wherein the information corresponds through at least one of a cryptographic permutation, a hash and a predetermined key.

B1. An identification document comprising a first graphic and a second graphic, the first graphic comprising a first digital watermark embedded therein having a first plural-bit payload, the second graphic comprising a second digital watermark embedded therein having a plural-bit payload, the identification document further comprising indicia thereon, wherein the first plural-bit payload comprises a representation of at least a portion of the indicia, and wherein the second plural-bit payload comprises information corresponding to the first plural-bit payload.

B2. The document of B1, wherein the information comprises the representation.

B3. The document of B1, wherein the information comprises at least one of a cryptographic permutation of the information, a hash of the representation, and a portion of the representation.

B4. The document of B1, wherein the representation comprises at least one of a hash of the indicia, a redundant version of the indicia and a subset of the indicia.

B5. The document of B1, wherein at least one the second payload comprises a checksum to verify the information.

Third Embodiment

Fragile Watermarks

A fragile or semi-fragile watermark is provided to any of the first and second embodiments as either a watermark replacement or to augment the above implementations. For example, in the second embodiment, a fragile watermark may be used as either the first or second watermark or as a third watermark component. In some implementations we preferably use our out-of-phase embedding techniques, e.g., as disclosed in PCT/US02/20832 (published in English as WO 03/005291), to embed a fragile watermark. It will be appreciated that a fragile watermark is designed to be lost or to predictably degrade upon certain types of signal processing. A semi-fragile watermark is designed to withstand normal signal processing, but is destroyed or predictably degrades upon malicious attacks.

The addition of a fragile or semi-fragile watermark adds protection against anticipated fraud scenarios by providing alerts when copies are made. Alteration in conjunction with card copying can be detected from the absence or condition of the fragile watermark.

Fourth Embodiment

Linking

In our fourth embodiment we provide a machine-readable link to related information. The machine-readable link is preferably provided via a digital watermark payload or identifier. The identifier can include a unique number that is used to interrogate a database or access a remote resource. In some cases the identifier includes a URL or a code that is used to access an appropriate URL. In a driver's license scenario, a digital watermark includes a link to an insurance database. The database includes data records evidencing that a cardholder does or does not have car insurance. In other cases, the digital watermark includes a link to a DMV database, to allow verification of information printed on the identification document, and perhaps a photograph of the cardholder. The database cardholder can be compared against the person presently holding the card. A "photo swap" can be further detected from comparison of a database photograph with a photograph carried on the card and a visual inspection of the current cardholder. The techniques discussed in assignee's U.S. patent application Ser. No. 09/571,422, filed May 15, 2000, and in U.S. Pat. No. 6,408,331 can be suitable interchanged with this linking aspect of the present invention. These patent documents are herein incorporated by reference.

Fifth Embodiment

Legacy Detection

Our fifth embodiment relates generally to handling ID documents including so-called legacy ID documents. The term legacy is used to generally refer to documents, which were previously produced with or without a particular feature like a digital watermark, but which differ in some manner from newly produced documents (e.g., they have or lack the feature). Consider a passport-issuing scenario in which renewal dates are spaced far apart (e.g., 10 years). Unless a total recall of old passports is issued, the population of outstanding passports will include both old passports (e.g., legacy documents) and new passports (e.g., which may include digital watermarking).

A challenge results for an ID document authentication process that authenticates a population of ID documents including both legacy documents (e.g., with no watermarking) and watermarked documents. To address this challenge we provide methods and systems to determine whether a digital watermark should be present in a document or whether the document was produced prior to the introduction of watermark embedding.

Assignee's U.S. Published Patent Application No. US 2002-0080994 A1, which is herein incorporated by reference, discusses a situation where a smart card carries information to trigger a watermark reader to look for a digital watermark. The trigger handles a case of legacy cards. In other words, the trigger serves as an indication to a watermark reader to check for a digital watermark. This allows reading new and legacy documents by the same reader.

We expand these techniques to further help differentiate between watermarked and non-watermarked ID documents, and/or to decide whether to search for a digital watermark on an ID document.

Figure 4:
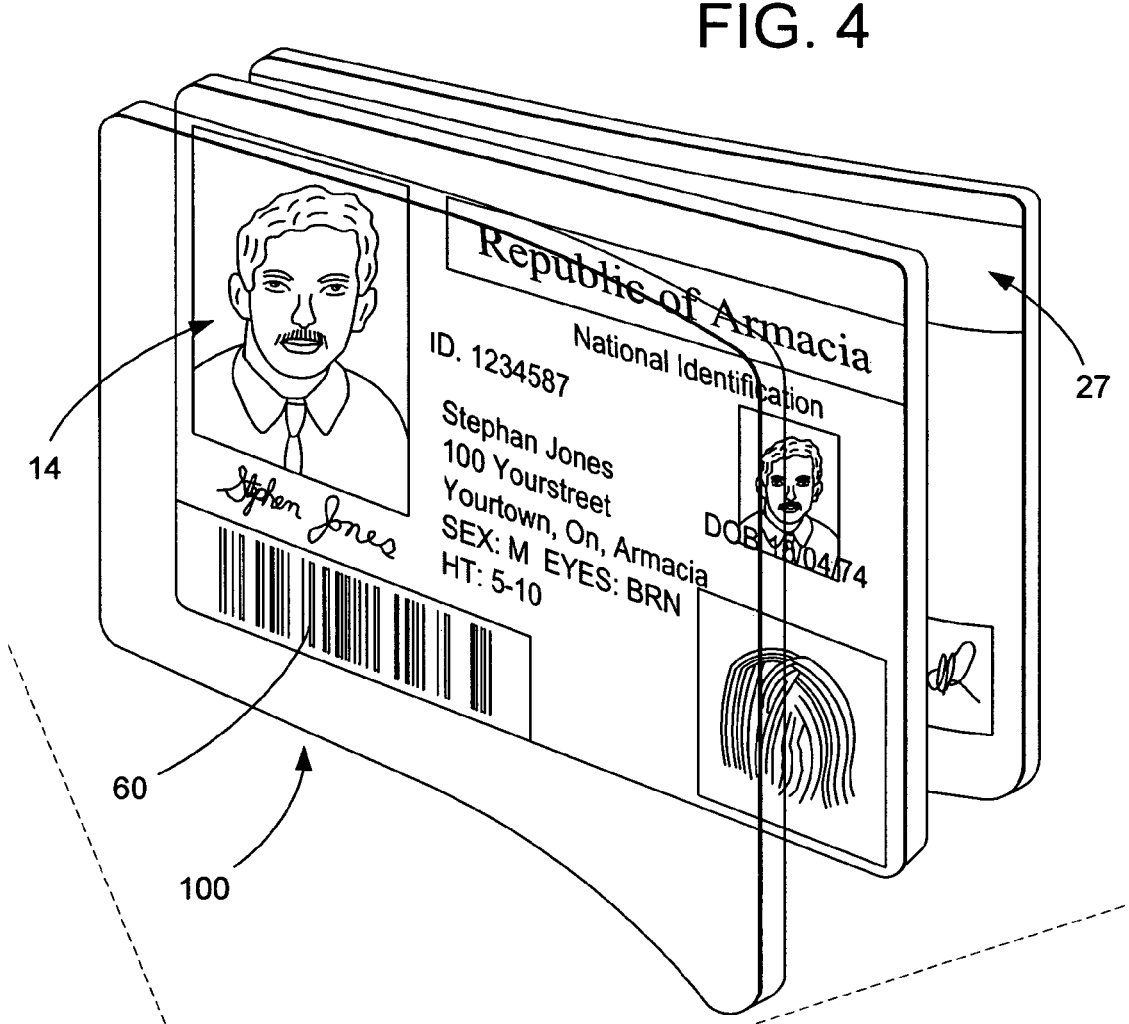
FIG. 4 illustrates an authenticating method according to still another aspect of the present invention.
Figure 4:
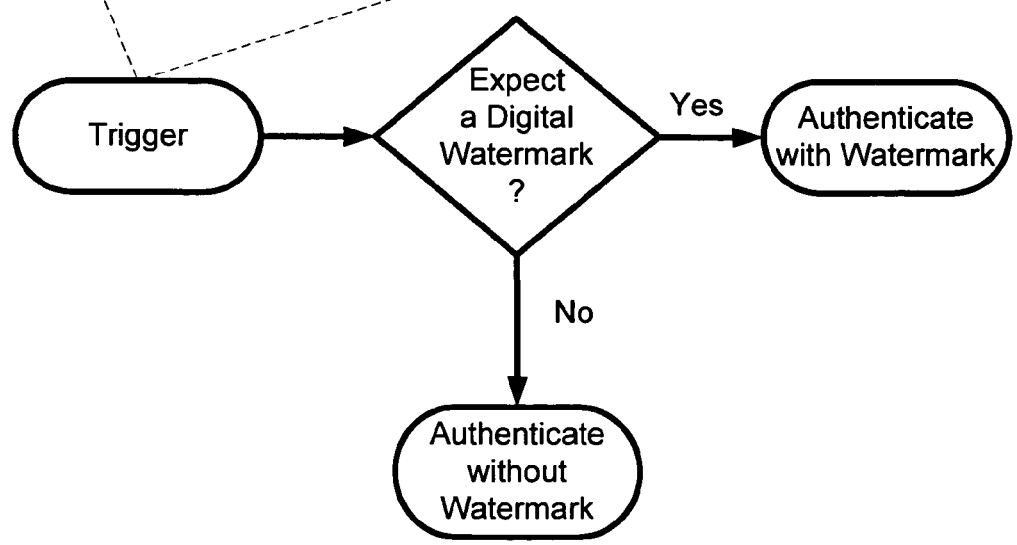

With reference to FIG. 4, ID document 100 includes a plurality of features including machine-readable features. The machine-readable features may include, e.g., a barcode (e.g., 1 or 2D barcodes) 60, magnetic stripe 27, optical memory (not shown), electronic circuitry (not shown), text for optical character recognition, etc., etc.

In a first implementation a machine readable feature includes a watermark search or detection trigger. For example, an issue date, or bits corresponding to an issue date, is stored in a magnetic stripe, optical memory, a barcode or other machine-readable indicia. The issued data serves as a "trigger" to evidence whether and ID document should or should not including watermarking.

With reference to FIG. 4, a reader, e.g., a barcode reader, a magnetic stripe reader, optical memory reader, optical character recognizer (OCR), etc., obtains a watermark trigger (e.g., issue date). Instead of an automated reader as shown in FIG. 4, an operator manually enters the trigger, e.g., manually enters the issue date. Of course, other information may trigger a watermark detection process like an expiration date, issuer code or jurisdictional identifier.

An authenticator (e.g., a processor under the control of software) uses the trigger to determine whether to carry out a watermark-based authentication procedure. For example, the issue date may correspond with a date that indicates that a digital watermark or a plurality of digital watermarks should be present on an authentic ID document. If so, the authenticator directs a digital watermark verification process, like is discussed in the above embodiments, to determine whether a digital watermark is present. Or the issue date may indicate that the ID document was produced before digital watermarks were rolled out into production (e.g., indicating a so-called legacy card). The authenticator then skips or disables a watermark detection process and/or authenticates the ID document using a different authentication technique.

In an alternative, but related, implementation, an authenticator directs a watermark detector to analyze optical scan data corresponding to an ID document. The scan data is searched for a digital watermark or for a plurality of digital watermarks. If the watermark detector is unable to find a digital watermark, the authenticator looks for a legacy indicator. For example, an issue date or expiration date is used to determine whether the ID document is a legacy document; or an operator is prompted to enter an issue or expiration date, or to enter a determination as to whether the ID document is a legacy card.

In another implementation we check for a legacy indicator (e.g., issue date) regardless of whether a watermark is detected. This implementation addresses a counterfeiting scenario where a watermarked feature (e.g., a watermarked photograph) is lifted from an authentic watermarked ID document and pasted onto a legacy document that should not include a digital watermark. If a watermark is found, but the legacy indicator suggests that a watermark should not be present, the ID document is considered suspect.

A client code can be combined with an issue date or expiration date to indicate which documents should or should not include digital watermarks. A "client code" is broadly used herein and may include, e.g., a code to identify a particular client or a particular type of identification document. The client code can be associated with a particular issue or legacy date, to help identify whether an identification document should or should not include digital watermarking. For example, a client code for a sports arena can be used to signal that all employee badges issued after Jan. 1, 2003 should include a digital watermark or a plurality of digital watermarks. And a client code for an airport tarmac crew can be used to signal that all security badges issued after, e.g., Apr. 15, 2003 should include a digital watermark or a plurality of digital watermarks. A magnetic stripe or barcode (or other machine-readable feature) carries the client code. An authenticator uses the client code to make a determination, for a particular client, as to whether a digital watermark should be present. (An authenticator can manage various client codes and relevant legacy dates via, e.g., a look-up table, software programming or by accessing a local or remote database.). By way of further illustration, an authenticator receives the airport's tarmac crew client code from a security badge. The issue date for the security badge is Mar. 11, 2003. The authenticator then knows that a digital watermark should not be present. Or the authenticator receives a client code corresponding to the sports arena. The corresponding employee badge was issued on Jun. 23, 2003. The authenticator then expects to find digital watermarking on the employee badge. Of course, client codes can be assigned to other entities, like states, nations, companies, etc.

Figure 5:
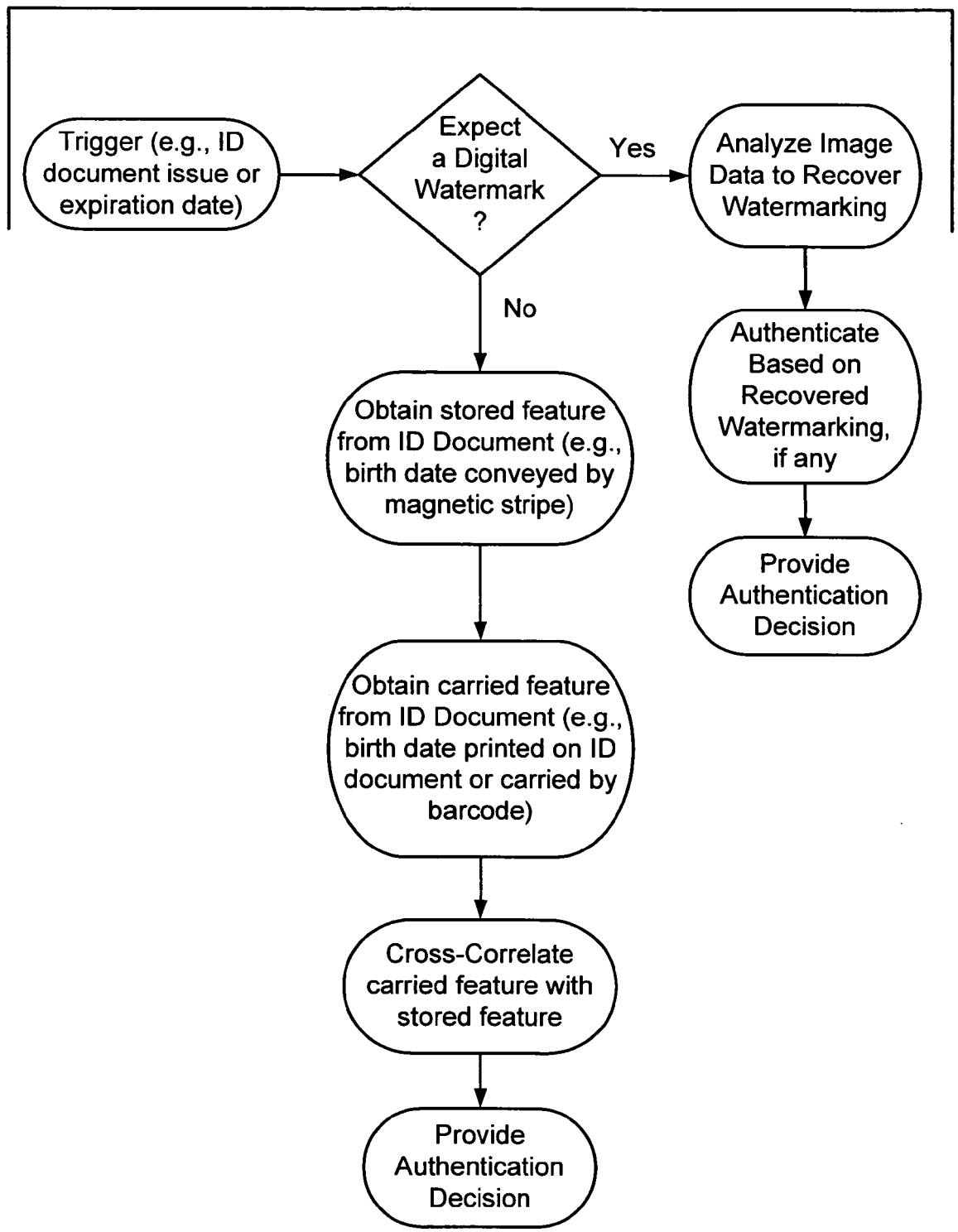
FIG. 5 is a flow diagram illustrating a versatile authentication process, which can operate in different authentication modes depending on a watermark detection trigger.

An authenticator is provided in another implementation to operate primarily between two different modes. Consider FIG. 5, where a versatile authentication process toggles between two authentication branches depending on a watermark detection trigger. The process is carried out, e.g., through a processor or electronic processing circuitry controlled by software. The trigger is analyzed to determine whether an ID document is expected to include digital watermarking embedded therein. If watermarking is expected, optical scan data is analyzed to recover the watermarking. In a two-watermark implementation, payload data is obtained from each of the two watermarks. The payload data, or subsets of the payload data, is compared to determine whether the document is authentic. Of course, if the watermarking is not recoverable, the document is considered suspect (e.g., potentially a counterfeit or unauthorized document).

If the trigger indicates that the ID document is not expected to include watermarking then the ID document is authenticated using a non-watermarking technique. For example, in one implementation the issue or expiration date (with perhaps a client code) is used as a trigger. If the issue date indicates that watermarking is not expected, another authentication clue, like a bearer's birth date, is obtained from the ID document. A birth date can be machine-read, e.g., from a magnetic stripe, optical memory, electronic circuitry, and/or barcode (e.g., PDF-417, 1-D barcode, etc.). The birth date can also be obtained from a remote repository, e.g., which is interrogated with a document number (e.g., driver's license number). A birth date obtained from such methods (e.g., machine-read, remote access, etc.) is referred to as a "stored birth date." The stored birth date is then cross-correlated with a birth date that is printed or otherwise carried on the ID document. The printed or otherwise carried birth date is called a "carried birth date." In some cases the carried birth date is carried via a machine-readable feature. For example, the stored birth date is conveyed through a barcode, while the carried birth date is carried by a magnetic stripe. Retrieving the carried birth date for cross-correlation with the stored birth date can be machine-aided (e.g., with OCR input of a printed birth date), or can be aided by an operator entering the birth date as printed on the ID document. The cross-correlation correlates the stored birth date with the carried birth date. The document is considered authentic when the carried and the stored birth dates correspond. Of course, if either (or both) of the carried or stored birth dates is not recoverable, or is not obtained, the document is considered suspect. Thus, this implementation provides a watermark readable/non-readable authenticator. (Instead of a birth date, other bearer or document specific information like an address (or a hash of an address), name (or hash of a name) or document number (or hash of a document number) can be suitably interchanged. The term "hash" in this context implies a reduced-bit representation of a larger number, value or character string.)

In still further implementations we add or change a feature on an ID document to signal that the ID document includes a digital watermark. For example, we shift or reposition a photograph carried by the ID document. Instead of positioning the photograph in the upper, left hand corner of the document, we position the photograph in the lower right hand corner, or we offset the photograph by a predetermined spacing. Or we print text (e.g., birth date) in a color (e.g., green) or with a different font. Still further we can place a machine-readable feature in artwork (e.g., a predetermined frequency response due to repetitive spacing of artwork features or lines). These features can be used to trigger (either manually or automatically) watermark detection. Or we can add a predetermined laminate, perhaps embossed or laser engraved features, which can be used to signal watermark detection. Related is a certain type of card stock—perhaps textured with machine-readable code—that signals digital watermarking. Indeed, most of the security features detailed in Appendix A can be used to signal the presence of a digital watermark. In still further implementations, we add a feature that can be pattern recognized. For example, we add a graphic that resembles a triangle. After capturing image data, a pattern recognizer searches the image data for the expected triangle. If found, the triangle signals an expected presence of digital watermarking.

Sometimes we prefer to add more subtle features to signal the presence of a digital watermark. In one implementation we shift the spatial starting position of text relative to other document features. For example, a document bearer's printed name or employee number can be spatially shifted with respect to the bearer's photograph. The spatial distance between a starting point of text and a photograph (e.g., a lower right hand corner of the photograph) can be machine-measured and used to trigger watermark detection. Of course, instead of shifting text, we can subtly reposition graphics or other artwork as well. In other cases we trigger off of an identification document number. For example, the number may include an extra character (e.g., the seventh or eighth character in) or a leading one or zero can be used to indicate digital watermarking. In other cases we use a plurality of characters, e.g., the last four characters or every other character to indicate the presence of digital watermarking.

While we have discussed handling legacy documents with respect to digital watermarking, this embodiment of the present invention is not so limited. Of course, our techniques apply to triggering detection of other types of machine-readable features or identifying other types of legacy documents as well.

A few illustrative combinations are shown below. Of course, these combinations are not meant to limit the scope of this aspect of the invention. Rather, the combinations are provided by way of example only.

C1. An identification document authenticator operable to authenticate an identification document through a digital watermarking authentication process or through a non-digital watermarking authentication process, a process being selected depending on a detection trigger, said authenticator comprising:
  electronic processing circuitry;
  a system communications bus;
  memory in communication with the electronic processing circuitry via the system communications bus, said memory comprising instructions for processing by the electronic processing circuitry, said instructions comprising instructions to:
  analyze data corresponding to the detection trigger;
  determine whether the data indicates an expected presence of digital watermarking in the identification document, and if so indicated, authenticate the identification document through the digital watermarking authentication process; and
  determine whether the data indicates an expected absence of digital watermarking, and if so indicated, authenticate the identification document according to the non-digital watermarking authentication process.

C2. The authenticator of C1, wherein the identification document carries the detection trigger.

C3. The authenticator of any one of C1 or C2, wherein the detection trigger comprises a document issue date C4. The authenticator of any one of C1 or C2, wherein the detection trigger comprises a document expiration date.

C5. The authenticator of C2, wherein the detection trigger is carried by a machine-readable feature.

C6. The authenticator of C5, wherein the machine-readable feature comprises at least one of a barcode, magnetic stripe, optical memory and electronic circuitry.

C7. The authenticator of C1, wherein the non-digital watermarking authentication process comprises a cross-correlation of first and second instances of bearer or document specific information carried by the document.

C8. The authenticator of C7, wherein the first and second instances each comprise data corresponding to a birth date.

C9. The authenticator of C7, wherein the first and second instances each comprise data corresponding to a name.

C10. The authenticator of C7, wherein the first and second instances each comprise data corresponding to a document number.

C11. The authenticator of C7, wherein the first and second instances each comprise data corresponding to an address.

C12. The authenticator of claim C1, wherein the digital watermarking comprises a first digital watermark including a first payload and a second digital watermark including a second payload.

C13. The authenticator of C12, wherein the digital watermarking authentication process comprises at least a cross-correlation of some of the first payload with at least some of the second payload.

C14. The authenticator of C1, wherein the memory comprises electronic memory circuits.

C15. The authenticator of C14, wherein the electronic processing circuitry comprises a processor.

C16. The authenticator of C1, wherein the memory comprises at least one of removable memory and fixed memory.

C17. The authenticator of C1 further comprising an input device.

C18. The authenticator of C17, wherein the detection trigger is manually entered into the authenticator via the input device.

C19. The authenticator of C17, wherein the detection trigger is machine-read into the authenticator via the input device.

C20. The authenticator of C17, wherein the input device comprises at least one of a key pad, mouse, magnetic stripe reader, optical memory reader, optical sensor, barcode reader, touch screen and smart card reader.

D1. A method to determine whether to authenticate an identification document through a digital watermark authentication process, wherein the identification document comprises a detection trigger, said method comprising the steps of:
  receiving digital data corresponding to the detection trigger;
  if the detection trigger indicates an expected presence of digital watermarking, analyzing optical scan data to decode the digital watermarking; and
  if the detection trigger indicates an expected absence of digital watermarking, providing an indication that the identification document is a legacy document.

D2. The method of claim D1, wherein the trigger comprises a document issue date.

D3. The method of claim D1, wherein the trigger comprises a document expiration date.

D4. The method of any one of D1-D3, wherein the document comprises a magnetic stripe, and wherein the trigger is stored by the magnetic stripe.

D5. The method of any one of D1-D3, wherein the document comprises electronic circuitry, and wherein the trigger is stored in the electronic circuitry.

D6. The method of any one of D1-D3, wherein the document comprises a machine-readable feature, and wherein the trigger is conveyed through the machine-readable feature.

D7. The method of D6, wherein the machine-readable feature comprises a barcode.

D8. The method of D1, wherein the trigger comprises a client code.

D9. The method of D8, wherein the trigger further comprises at least one of a document issue date and a document expiration date.

D10. The method of D1, wherein the providing an indication comprises disabling or foregoing a watermark detection process.

D11. The method of D1, wherein the providing an indication comprises outputting a signal to indicate that the document is a legacy document.

D12. The method of D11, wherein the signal is displayed through a graphical user interface.

D13. The method of D11, wherein the signal activates a warning.

D14. The method of claim D11, wherein the signal controls or initiates an automated, but non-watermarking based, authentication process.

Sixth Embodiment

Plural Watermarks

While some of the above embodiments have envisioned enhanced identification document security through embedding of two digital watermarks, the present invention is not so limited. Indeed, the inventive techniques discussed herein will apply to identification documents including three or more watermarks as well. For example, watermark payload correspondence as discussed under the Second Embodiment can involve three or more watermarks.

Advantages of Watermarking Identification Documents

Some advantages provided to identification documents by digital watermarking may include the following bullet list. Of course, this list is not meant to limit the present invention, and many of the disclosed embodiments need not include such advantages. By way of illustration only, some watermarking advantages include:

A covert security feature, since a watermark is not generally visually discernible.

No significant impact on an identification document's limited "real estate."

When deployed across multiple areas, a simple, common authentication mechanism (watermark) is provided when optically reading the identification document. This addresses the complexity issues related to detecting false documents. In a driver's license context, both documents with and from out of state can be authenticated.

Linking to a database (e.g., a DMV, insurance database, etc.) can be enabled, based on policies set and enforced by each document issuing government or organization. Watermark reading software can be implemented to provide access to software based on government or organization policy and reading audience, or alternatively, in-state/out-of-state status.

By providing a linking mechanism versus encoding information on the document itself, inappropriate access to cardholder personal data is prevented. Also, if a government's policy regarding data access for a certain audience changes, this can be implemented in the reader software, enabling dynamic policy changes, without having to reissue identification documents.

Some advantages of watermarking to government agencies (e.g., DMV, law enforcement officials, and other authorized audiences) and financial institutions are discussed in the following bulleted list. Of course, this list is not meant to limit the present invention, and many of the disclosed embodiments need not include such advantages. By way of illustration only, some watermarking advantages for government agencies include:

DMV forensics agents can detect cards that have been copied and altered, as well as track back to the originating card(s).

Point of sale agents for age-controlled products can locally authenticate a card with respect to card authenticity and age status, without gaining machine-readable access to the individual's demographic data and compromising cardholder's privacy. Watermarking may also provide an ability to read cross-jurisdictional identification documents thus providing better data sharing.

Any inspector equipped with a digital watermark reader can detect "simulated" cards.

The common "photo swap" attack can be automatically detected (e.g., see the first and second embodiments discussed above).

Text alterations and/or substitutions on otherwise legitimate documents can be automatically detected.

Insurance verification can be provided to Law Enforcement by linking to an insurance company database, using the watermark identifier information.

Law enforcement or other authorized users, with the appropriate authorizations and privileges, can selectively and securely link to "back-end" databases for access to photos, biometrics, demographics, and outstanding warrants via a simple imaging or scanning of the identification document.

Crosschecks on a cardholder's name can be done so that financial institutions can further authenticate identity.

Detecting Media Areas Likely of Hosting Watermarks

Orientation Components

The subject matter in this section relates to assignee's U.S. patent application Ser. No. 10/032,282, filed Dec. 20, 2001 (published as US 2002-0114491 A1) and Ser. No. 09/945,244, filed Aug. 31, 2001 (published as 20020057823 A1). Each of these U.S. patent documents is herein incorporated by reference Steganographic calibration signals (sometimes termed "marker signals," reference signals," "grid signals," or "orientation components," etc.) are sometimes included with digital watermarking signals so that subsequent distortion of the object thereby marked (e.g., a digital image file, audio clip, document, etc.) can later be discerned and compensated for. Such arrangements are detailed in the related applications.

One type of watermark orientation component is an image signal that comprises a set of impulse functions in a transform domain, like a Fourier magnitude domain, e.g., each with pseudorandom phase. To detect rotation and scale of a watermarked image (e.g., after printing and scanning of the watermarked image), a watermark decoder converts the watermarked image to the Fourier magnitude domain and then performs, e.g., a log polar resampling of the Fourier magnitude image. A generalized matched filter correlates a known orientation component with the re-sampled watermarked signal to find the rotation and scale parameters providing the highest correlation. The watermark decoder performs additional correlation operations between the phase information of the known orientation signal and watermarked signal to determine translation parameters, which identify an origin of the watermark signal. Having determined the rotation, scale and translation of the watermark signal, the watermark reader then adjusts the image data to compensate for this distortion, and extracts the watermark message signal.

An exemplary orientation signal may include one or more of the following characteristics:

1. It comprises a collection of impulse or delta functions in the Fourier magnitude domain;
2. The impulse functions have pseudo random phase (i.e. the phase is random, yet the phase is known so that translation (e.g., its X and Y origin) of the watermark can be computed by correlating the know phase information of the calibration signal with the watermarked signal); and 3. The impulse functions are typically distributed in the mid-frequency range so as to survive distortion yet not be perceptible In other embodiments, different orientation components can be used in differently watermarked excerpts of the content. An image may be segmented into blocks, pre-filtered, and then converted into the Fourier domain. The Fourier representation for all the component blocks can be accumulated, filtered, and remapped into the log-polar domain.

Multiple Watermarks on Printed Documents

As discussed above, some watermarking implementations include a printed document having a plurality of digital watermarks embedded thereon. We have developed methods and systems to quickly identify areas where the digital watermarks may be embedded, and then focus decoding efforts on the identified areas, particularly when each of the embedded digital watermarks includes an orientation component (or calibration signal). Message decoding efforts can focus on areas identified as likely candidates of including a digital watermark.

We choose to illustrate our inventive methods and systems with respect to printed documents, such as financial documents, e.g., checks, banknotes, financial instruments, legal instruments and identification documents. Some financial and identification documents may include so-called radio frequency identification circuitry (RFID), smart card chips or circuitry, optical memory, magnetic memory, etc. Of course, our techniques apply to other objects and media (e.g., digital images and video) as well.

Figure 6:
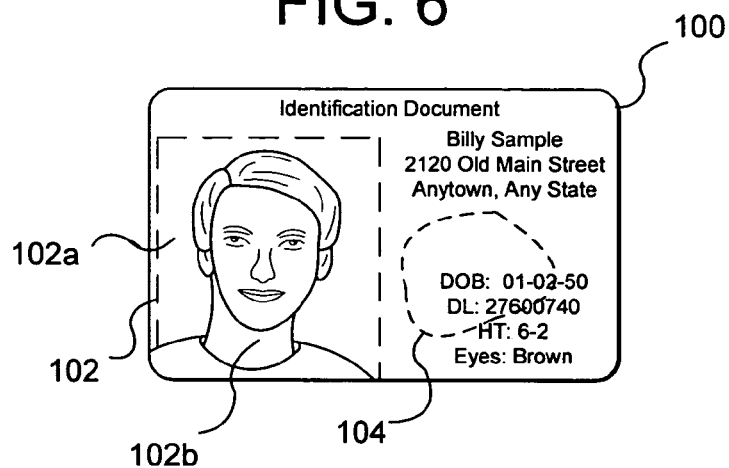
FIG. 6 illustrates an identification document including two areas, with each area hosting a different digital watermark.

FIG. 6 illustrates a printed ID document 100. ID document 100 preferably includes a photographic representation 102 of a bearer of the ID document 100. The photographic representation 102 may include, e.g., a background portion 102a and a likeness of the bearer portion 102b. The ID document 100 will typically include printed indicia like text (e.g., name, address, jurisdiction, document number, birth date, etc.), machine-readable code (e.g., 1 or 2-D barcodes—not shown in FIG. 6), graphics, background patterns, seals, emblems, artwork, etc. Sometimes the printed indicia is printed with visible or invisible (e.g., UV or IR) inks. Of course, the ID document 100 may include a wide variety of other features like optical or magnetic memory, microprinting, holograms, Kinograms®, electronic circuitry (e.g., a so-called smart card), ghost or faintly reproduced images, etc., etc.

ID document 100 includes a plurality of watermarks embedded thereon. To simplify the discussion ID document 100 includes two (2) digital watermarks. It should be appreciated, however, that our techniques apply to documents including one and three (3) or more digital watermarks as well.

A first digital watermark is embedded in the photographic representation 102 (FIG. 6). The first digital watermark can be embedded in the background portion 102a, embedded in the likeness portion 102b, or embedded in both portions 102a and 102b. In our preferred implementation we redundantly embed the first digital watermark throughout the photographic representation 102 or a portion of the photographic representation 102. The first digital watermark typically includes an orientation component (hereafter called a "first orientation component") and a first message component. The first orientation component is embedded at (or is embedded so as to represent) a first orientation. For example, the first orientation corresponds to a first scale, rotation and/or translation. Translation can be a measure or reflection of a distance or relationship to a predetermined origin or spatial location (e.g., the upper left corner of the identification document). An orientation component may also reflect a particular message starting position or location. If the first digital watermark is redundantly embedded throughout the photographic representation 102, the redundant instances of the first orientation component preferably include the same (or at least closely similar) first orientation.

A second digital watermark is embedded in area 104. Area 104 includes a graphic, seal, background area, artwork, ghost image, photographic image, hologram, Kineogram® or line art, etc. (hereafter generally referred to as "artwork"), in which the second digital watermark is embedded. The artwork may overlap with text or other document features. While area 104 is illustrated as a bounded and limited area, area 104 can alternatively occupy much larger or smaller document 100 areas. In our preferred implementations we redundantly embed the second digital watermark throughout area 104. The second digital watermark typically includes an orientation component (hereafter called a "second orientation component") and a message component. The second orientation component differs from the first orientation component. The difference may be subtle such as a difference in embedding scale, rotation or translation, or may explicitly differ in terms of a different calibration technique or embedding protocol.

The second orientation component is preferably embedded at (or is embedded so as to represent) a second orientation, e.g., at a second scale, rotation and/or translation. If the second digital watermark is redundantly embedded throughout area 104, the redundant instances of the second orientation component preferably include the same second orientation.

Thus, the first and second digital watermarks each preferably include an orientation component that differs from one another (e.g., the orientation components differ in terms of scale, rotation and/or translation, etc.) or differs relative to a know or predetermined orientation component.

Figure 7:
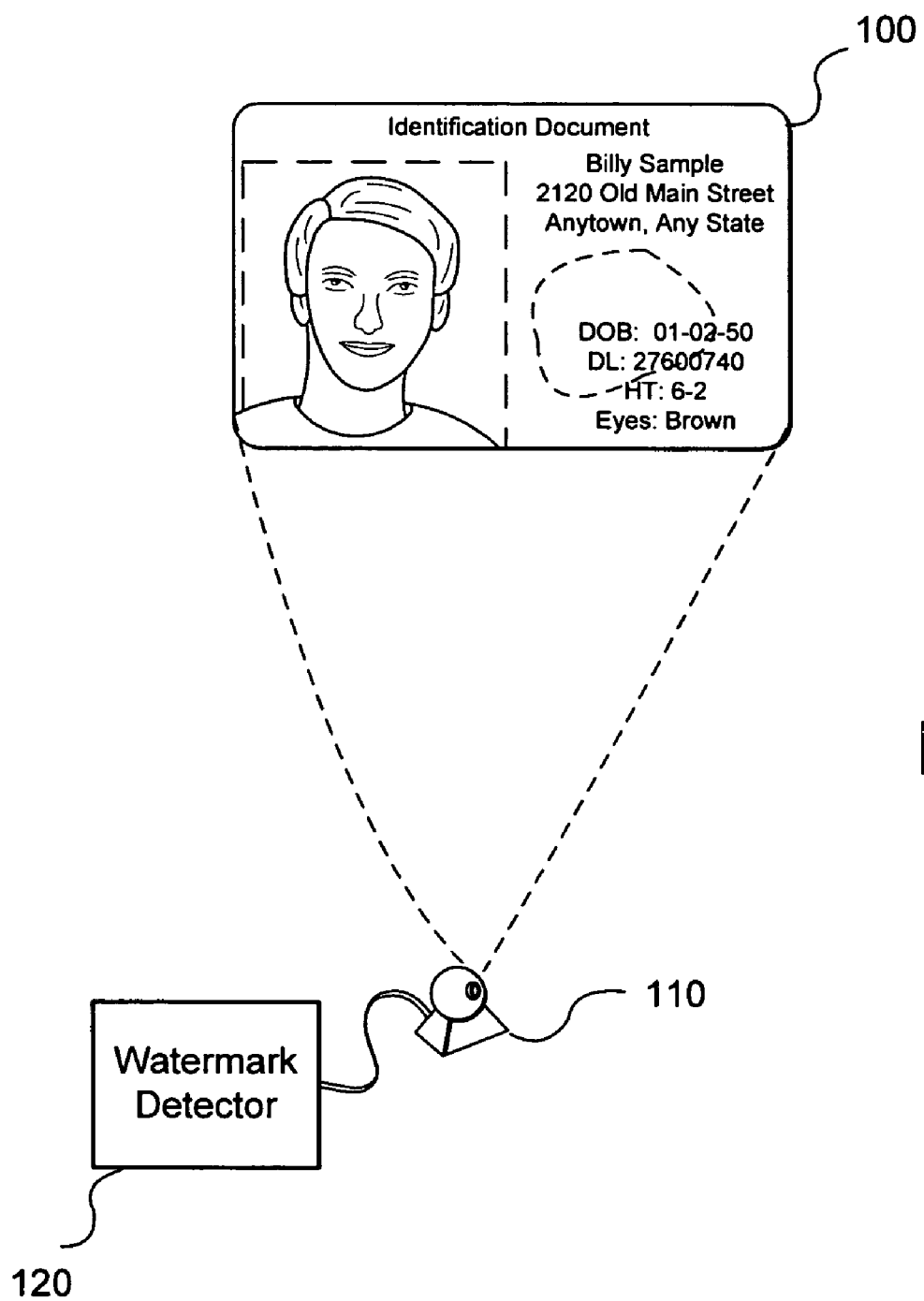
FIG. 7 illustrates image capture of the FIG. 6 identification document.

A digital watermark detection process is discussed with respect to FIGS. 7 and 8A-8C. ID document 100 is presented to a sensor 110 (FIG. 7). Sensor 110 can take a variety of forms. For example, sensor 110 may include a flatbed scanner, an optical sensor or array, a CCD optical sensor, a handheld device, web camera, a digital camera (e.g., as is commonly associated with today's cell phones or handhelds), etc. Sensor 110 captures scan data (or "image data") that represents ID document 100 or a portion of the ID document 100. The captured scan data is communicated to a watermark detector 120 (e.g., electronic processing circuitry controlled by software).

Figure 8A:
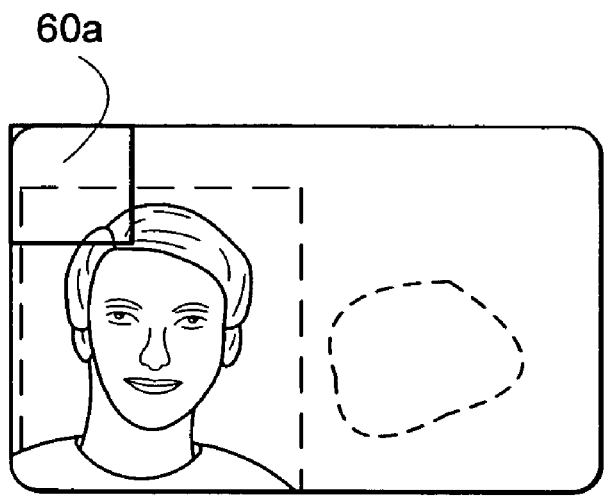
FIGS. 8A-8C illustrate window-based detection.

Watermark detector 120 is configured to analyze windows or image areas (e.g., blocks, image portions or segments), in search of watermark orientation components or in search of characteristics that are associated with watermark orientation components. For example, the watermark detector 120 analyzes scan data associated with a first window 60a (FIG. 8A). The window sizes can vary according to detector specifications. To illustrate, we select a window, e.g., having 32×32 pixels, 64×64 pixels or 128×128 pixels.

Figure 8B:
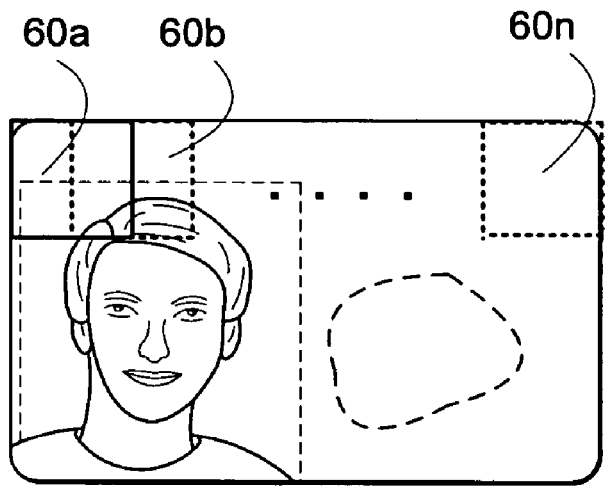
Figure 8C:
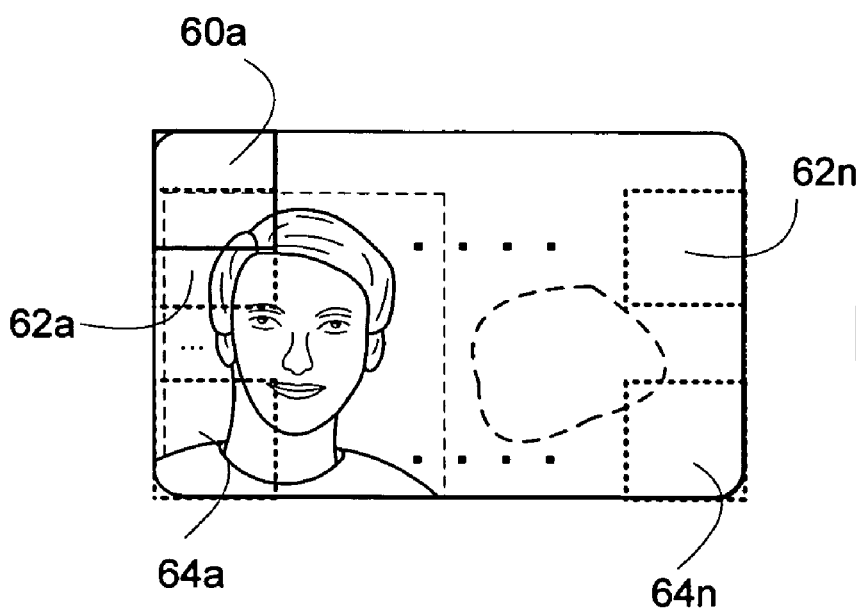

We prefer a sliding window approach for our detector. That is, after the watermark detector 120 analyzes image area 60a, it analyzes an adjacent, perhaps even overlapping, window area 60b, and so on until it analyzes a last window 60n for a first window row (FIG. 8B). The window can be repositioned to analyze additional windows (e.g., 62a-62n) until it analyzes a last row of windows (64a-64n) as illustrated in FIG. 8C. Of course, the detector 120 can alternatively select windows at random (or pseudo-random), or select windows corresponding to a central area of the ID document 100. Also, a first window 60*a* need not be selected from the upper left hand corner of the ID document 100, but can be selected from other starting image portions as well. In still further alternative implementations, once a watermark has been found in a particular window, the detector analyzes adjacent windows, and then branches out from the adjacent windows.

While not necessary to do so, the watermark detector 120 preferably analyzes all of the captured image data. (Alternative implementations only look at a subset of the captured image data.). To illustrate, e.g., if the scan data corresponds with a 1024×1280 pixel area, and if 64×64 pixel windows overlap by 50 percent, about 1280 windows are analyzed. Of course the number of windows will decrease as the window size increases and/or as the overlap area decreases.

Each window or image portion is preferably classified in terms of its orientation characteristics. For example, the detector 120 compares an orientation of each image window or block (some of which may include no watermark signal at all) to that of a predetermined orientation (e.g., an orientation corresponding to an expected watermark orientation component). A metric or measure can be used to classify each image portion in terms of its determined orientation or in terms of its determined orientation relative to the predetermined orientation. An orientation measure may include factors such as rotation, scale, translation, etc.

The detector 120 (or a computer cooperating with the detector 120) remembers or groups together those windows or image portions which have the same metric or orientation measures. The term "same metric" is broadly used and may include an exact sameness or the metric may include a tolerance. For example, orientations falling within plus-or-minus 1-10 degrees (for rotation) may be grouped together, or those falling within plus-or-minus 2-10% scale or translation might similarly be grouped. After grouping the blocks, the detector (or a cooperating computer) sifts through the groupings to identify predominate groups. The two most predominate groups will likely correspond to one of a first watermark orientation component and a second watermark orientation component.

Figure 9A:
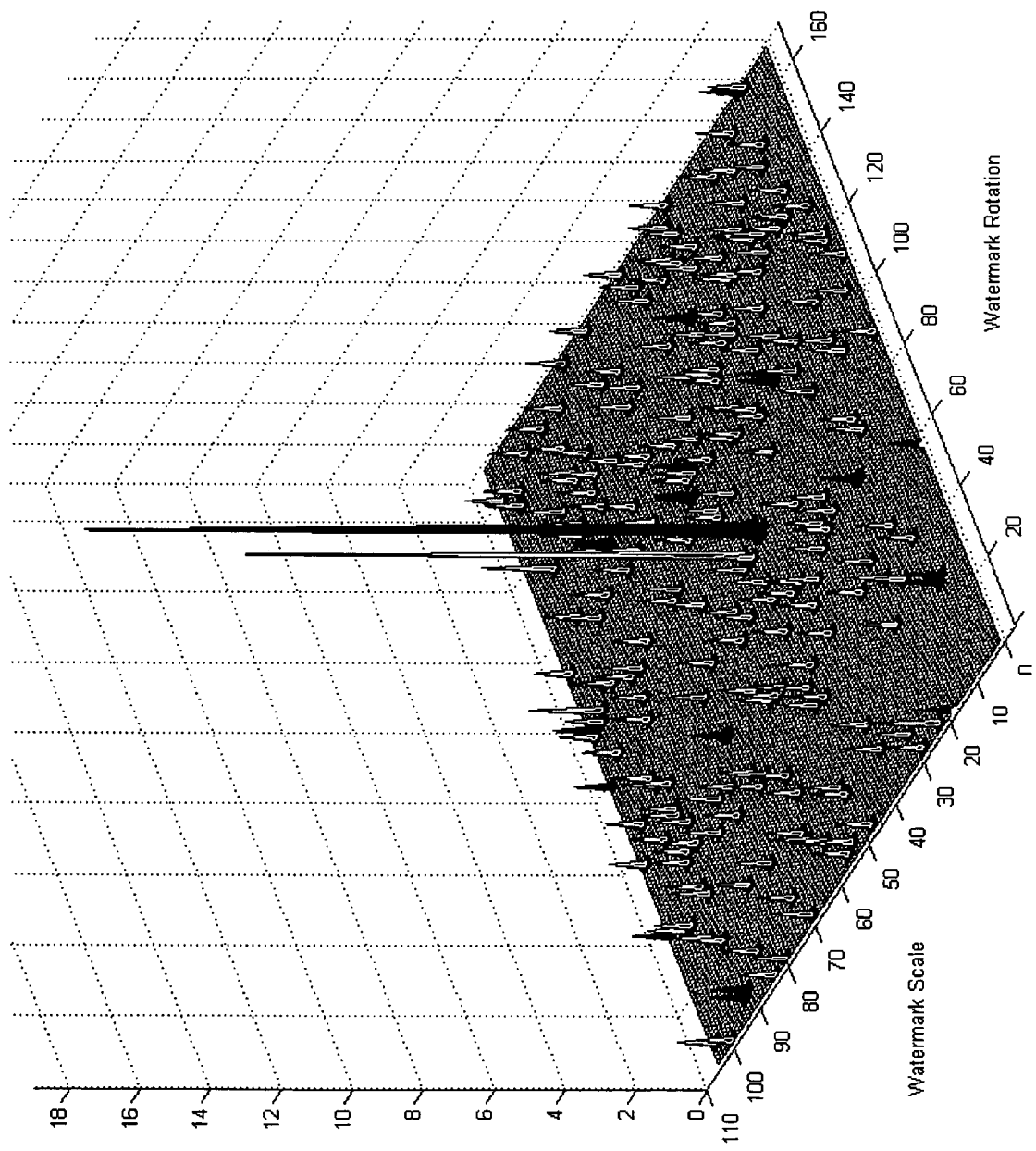
FIGS. 9A and 9B illustrate histograms, which classify orientations of different image windows.

FIG. 9A shows a histogram illustrating a relationship between classified blocks (where the z axis represents a number of image windows having a particular orientation) in terms of scale (x axis—in terms of a scale relative to a predetermined scale) and rotation (y axis—in terms of rotation angle in degrees from a predetermined angle). As shown, the histogram includes two strong peaks, each at different orientations. To be more precise, the two peaks share the same rotation, but differ in terms of scale. The peaks correspond to the first watermark orientation component at a first rotation and first scale, and a second watermark orientation component at the first rotation, but second and different scale. The histogram provides a tidy graphical analysis to determine blocks with the same (or closely similar) orientation values. The small peaks in FIG. 9A correspond to image windows that include various orientation values (e.g., images areas that do not have a digital watermark orientation component embedded therein).

Figure 9B:
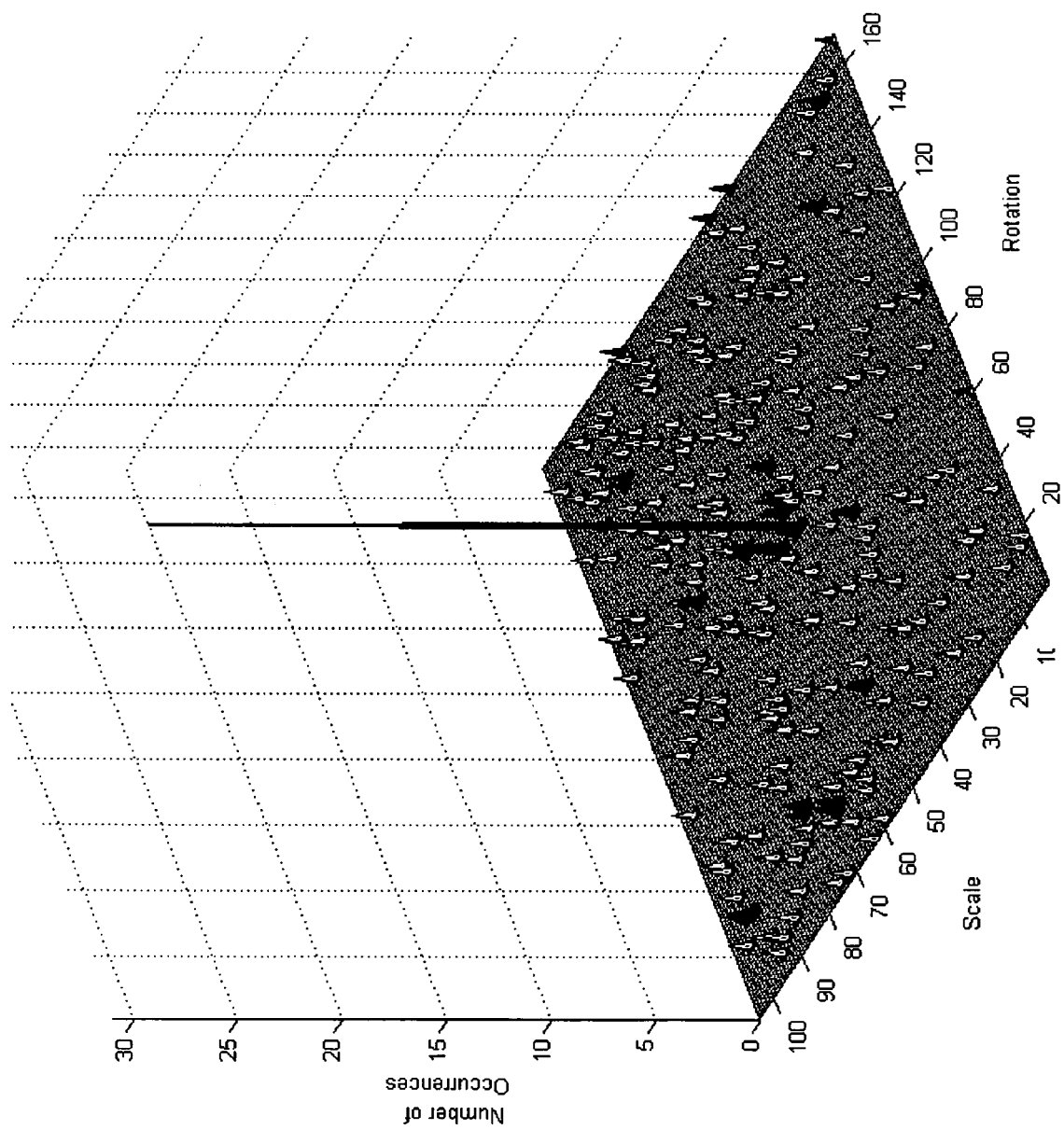
Figure 10A:
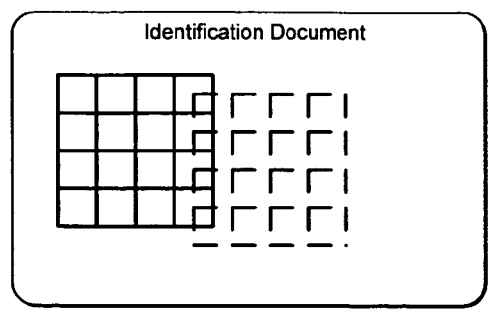
FIGS. 10A-10D illustrate classification of image windows based at least on a watermark orientation component include a translation measure.
Figure 10B:
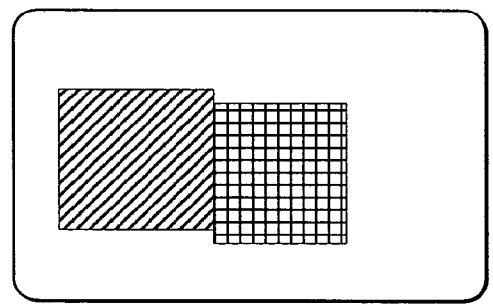
Figure 10C:
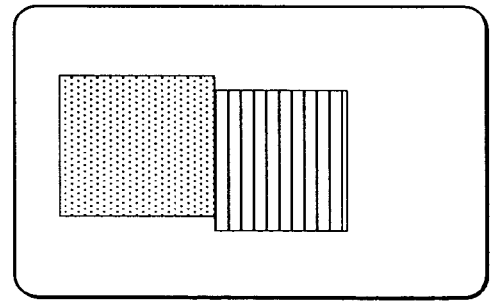
Figure 10D:
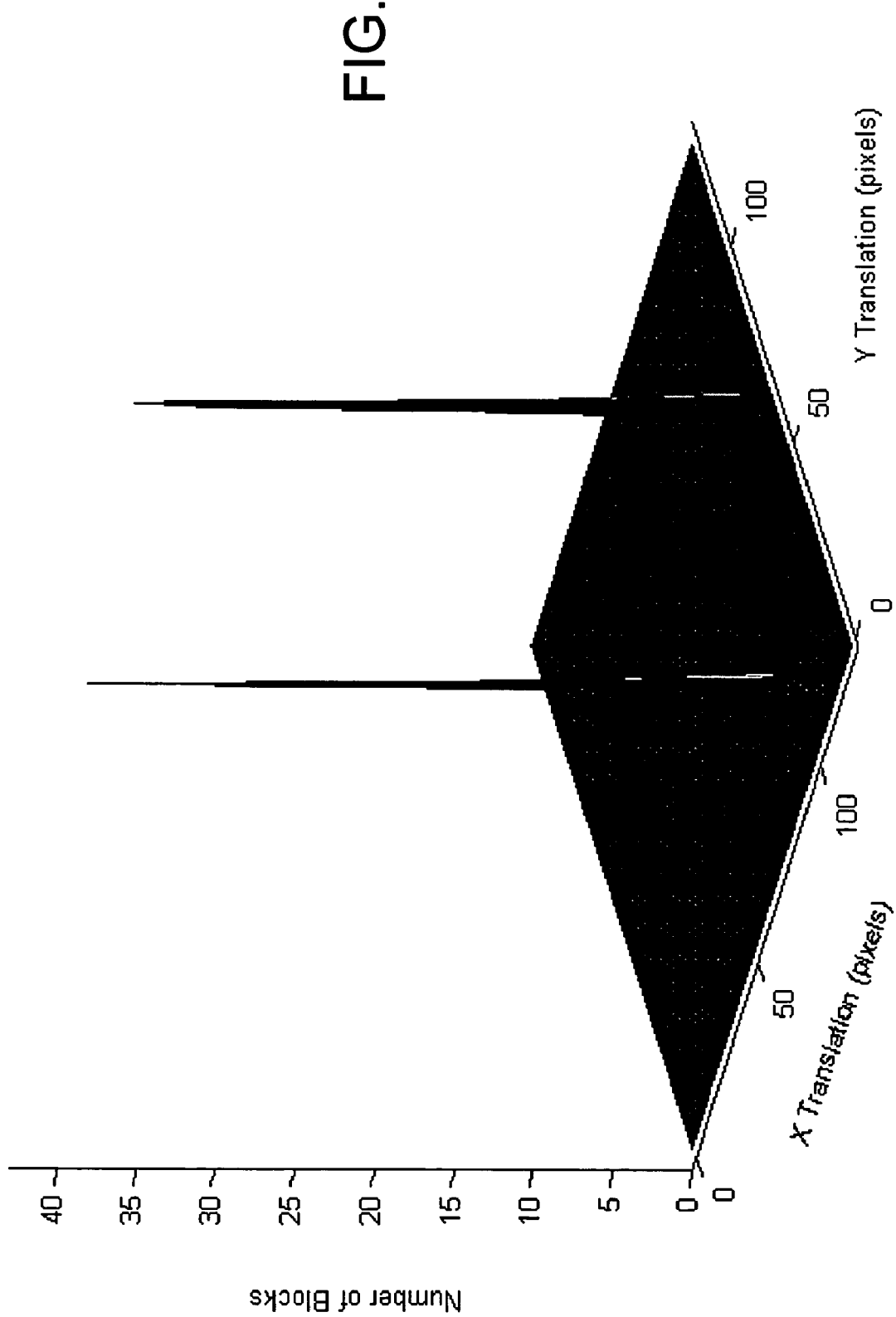

There may be some cases in which the two or more watermark components have the same rotation and scale. For example, only a single predominate peak is seen in FIG. 9B since the first and second orientation components include the same rotation and scale. In these cases other orientation parameters, like translation, can be analyzed to distinguish between different orientation components. These other implementations may include an orientation metric, which includes a translation factor. Image portions can be plotted or analyzed in terms of their orientation metrics as shown in FIGS. 10A-10D. More precisely, FIG. 10A shows an identification document including two watermarks redundantly embedded therein (shown by the two "grids"—one solid and one dashed—where each grid tile represents a redundant instance of a watermark or watermark component). Each of the watermarks includes a different translation with respect to an upper left corner (or other predetermined origin) of the identification document. As a watermark detector analyses the document as discussed with reference to FIGS. 8A-8C it may determine a particular translation value for each window. Since the redundant instances will have the same translation values (perhaps after adjustment for relative tile positioning within the first or second grids), watermarked areas can be determined. FIGS. 10B and 10C illustrate document areas having the same relative translation in terms of x-translation and y-translation. Windows can be grouped together based on similar translation values as shown by the histogram in FIG. 10D. The predominate two groups identify likely locations of the first and second watermarks, since they have common translation values.

Figure 11A:
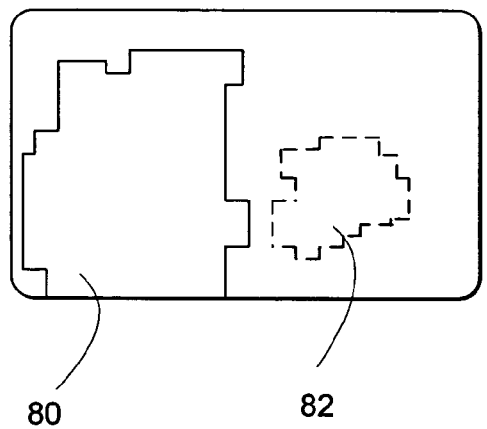
FIG. 11A illustrates two document areas that likely include watermark information.

Once predominate orientations are identified, document areas 80 and 82 shown in FIG. 11A (or areas corresponding to scan data including the predominate orientations) can be identified. The identification may involve, e.g., determining which image portions have an orientation corresponding to predominate orientations or which image portions fall within the predominate groups. Areas 80 and 82, or image windows corresponding to areas 80 and 82, can be further analyzed to detect a watermark message. (Areas 80 and 82 in FIG. 11A are intentionally drawn with jagged or varying boundaries. The variation may be caused in some implementations, e.g., where the sample windows do not precisely correspond with embedding areas boundaries.).

Figure 11B:
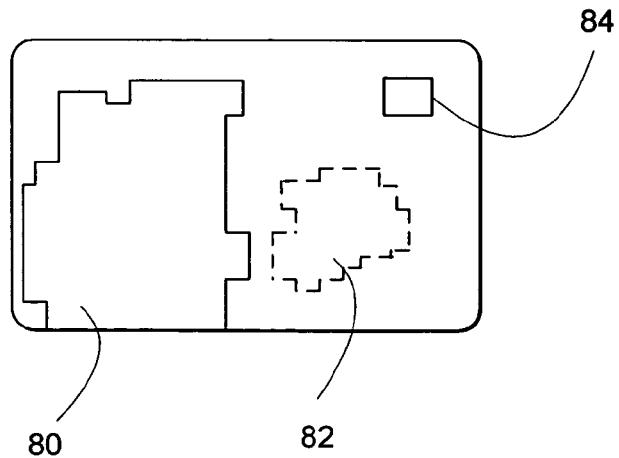
FIG. 11B illustrates an isolated window.

Sometimes we may see an isolated window 84 identified as shown in FIG. 11B. The isolated window may be identified as likely including a watermark because is has an image or noise orientation that is similar to one of the selected watermark orientation components. We optionally test for isolation to jettison such an isolated block 84, since the isolated block is not likely to include watermark information, but rather reflects noise having a similar orientation. One method tests each selected window to ensure that it has at least one or more neighboring selected windows. If it does not, the isolated window 84 is disregarded.

Figure 12:
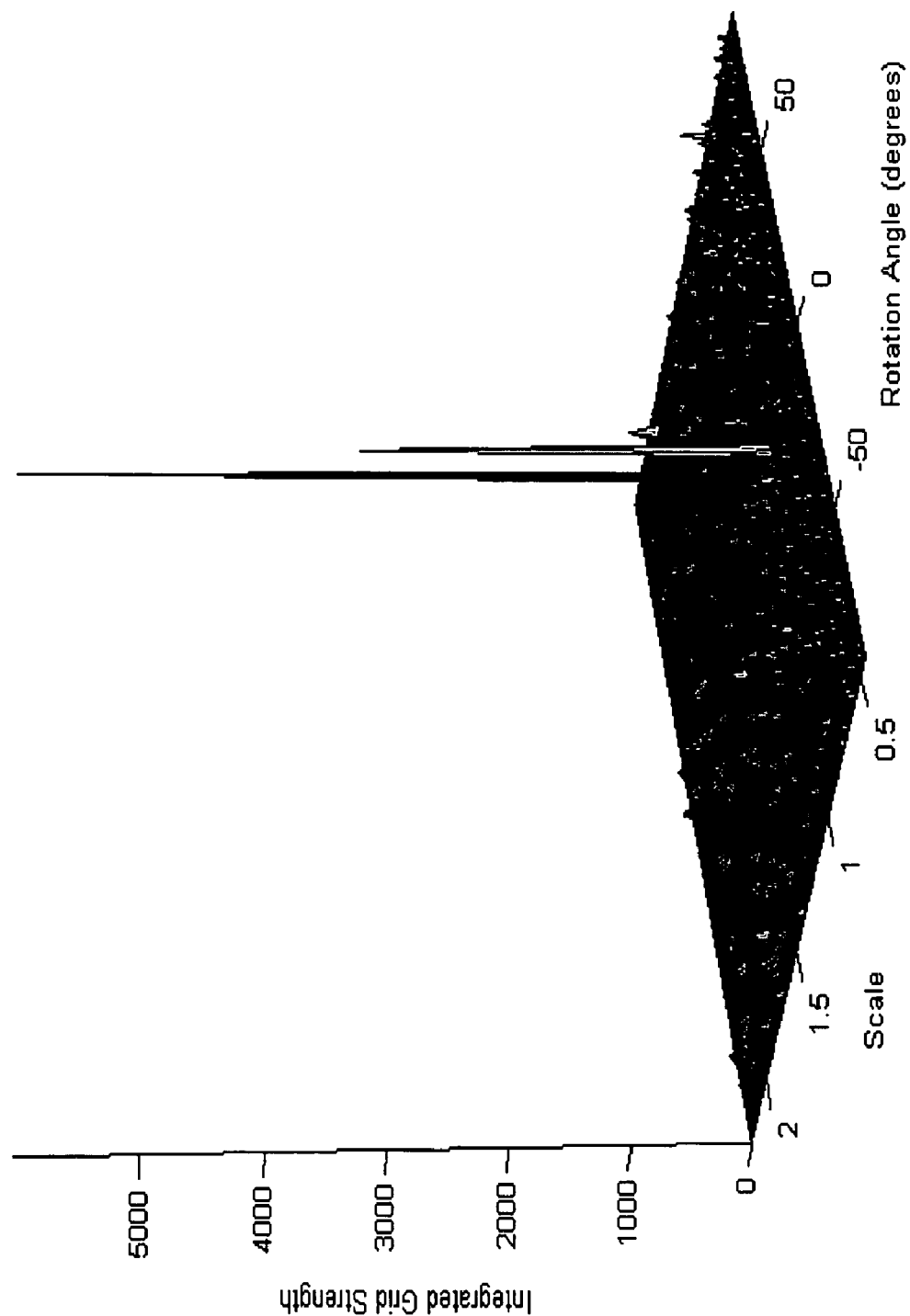
FIG. 12 illustrates a histogram classification of image windows based as least in part on digital watermark strength.

As an alternative grouping technique, a watermark "strength" is determined for each window. Each image window then has an orientation metric and a strength metric associated therewith. The strength metric is a representation of a watermark characteristic, or a relative correlation between an expected watermark signal and the detected watermark signal. Windows are grouped according to their orientation metrics, but are represented according to a collective strength of all of the windows in a group (e.g., we add together the strength metric for each window within a group). Groups are then represented in terms of collective group strength and not in terms of the number of windows within a group. A strength metric provides an even more prominent indication of watermarked windows, e.g., as shown by the histogram peaks in FIG. 12.

As a further alternative approach, we filter image data or histogram data to help jettison unwanted noise. This approach even further increases the prominence of window groups or peaks over background noise.

Our approach saves processing time since only those areas including watermark orientation components are further analyzed to detect a watermark or payload message.

Copy Detection

In addition to reducing processing time and ensuring better watermark detection, our techniques may be used as a copy detection tool.

Consider a financial document like a check. A common counterfeiting technique "cuts and pastes" (perhaps digitally) features from one check to another check. For example, a counterfeiter may cut and paste a bank seal or logo from one check onto another.

To help detect a copy we provide a document (e.g., a check from Bill's Bank) with two embedded digital watermarks. Each of the first and second digital watermarks includes a first and second orientation component, respectively. The first and second orientation components have a known relationship to one another or a known relationship to a predetermined orientation component. To simplify the discussion, lets say that the first orientation component has a scale that is 82% of an expected scale, and the second orientation component has a scale that is 78% of an expected scale.

A watermark detector can expects to find the relative scales for the first and second orientation components in order to authenticate Bill's check. (Of course, the detector can account for any optical sensor discrepancies, such as unwanted scaling relative to the printed check.).

The document is considered suspect if the orientation components' scales are not as expected.

In some implementations, each bank (or client type) includes a unique orientation component relationship between its watermarks. For example, if the customer or account is associated with a commercial endeavor, then the orientation components are related according to a first predetermined relationship. But if the customer or account is associated with a government endeavor then the orientation components are related according to a second predetermined relationship, and so on.

A third watermark or watermark component can be used to convey the predetermined relationship or a watermark detector can be configured to expect a certain relationship.

Even if the counterfeiter is careful when replicating a predetermined scale and rotation, it remains difficult to properly align the multiple watermarks to achieve a predetermined translation.

Our copy detection also works with ID documents where a counterfeiting technique involves photo or feature swapping. A first watermark is embedded in a photograph, and a second watermark is embedded in a background or artwork. Each of the first and second watermarks includes an orientation component. The orientation components have a predetermined relationship to one another or to a control orientation component. Scan data is collected and orientation parameters are determined. The determined orientation parameters are analyzed to detect a counterfeit document or photo swap. (Different issuers (e.g., state or country) can include a unique orientation component relationship. If the relationship is not what is expected for the issuer, then the document is considered suspect.).

In alternative implementations a financial document or ID document includes a visible fiducial or overt structure printed or engraved thereon. Orientation parameters are determined relative to the visible fiducial or structure. For example, a scale or rotation of a watermark orientation component is determined relative to the fiducial, and image portions are classified by their relative relationship (or any deviation from an expected relationship) to the fiducial.

A few illustrative combinations are shown below. Of course, these combinations are not meant to limit the scope of this aspect of the invention. Rather, the combinations are provided by way of example only.

E1. A method to detect a copy of a printed document, the printed document comprising a first area and a second area including, respectively, a first digital watermark and a second digital watermark, wherein the first digital watermark includes a first orientation component and the second digital watermark includes a second orientation component, said method comprises:
receiving scan data associated with the printed document;
segmenting the scan data into a plurality of portions;
determining an orientation parameter for at least some of the portions;
identifying from the determined orientation parameters, at least two most prominent orientation parameters;
comparing at least one of: i) a relationship between the two most prominent orientation parameters; ii) the two most prominent orientation parameters to predetermined orientation parameters; and iii) a relationship between the two most prominent orientation parameters and an expected relationship between the two most prominent orientation parameters; and
based on the comparing step, determining whether the printed document is an original or is a copy of the printed document.

E2. The method of E1 wherein the printed document comprises a financial document.

E3. The method of E1 wherein the printed document comprises an identification document, and wherein the first area corresponds with a photographic representation of a bearer of the identification document.

E4. The method of E1, wherein the orientation parameter comprises rotation and scale.

F1. A method of determining areas of media that have a likelihood of including digital watermark information, said method comprising:
receiving digital data corresponding to the media;
analyzing a plurality of portions of the digital data to determine an orientation measure for each of the portions, wherein the orientation measure provides an orientation measure relative to a predetermined orientation measure; and
identifying a predetermined number of orientation measures that have at least one of: i) a highest number of portions associated therewith; and ii) a strongest collective watermark strength associated therewith.

F2. The method of F1, wherein the media comprises a digital image.

F3. The method of F1, wherein the media comprises video.

F4. The method of F1, wherein the media comprises a printed document.

F5. The method of F4, wherein the printed document comprises at least one of an identification document and a financial document.

F6. The method of F1, further comprising analyzing portions that correspond to the identified orientation measures to recover the digital watermark information F7. The method of F6, wherein the identified orientation measures respectively correspond to different digital watermark orientation components.

F8. The method of claim F6, wherein prior to said analyzing step, said method further comprises manipulating the portions that correspond to the identified orientation measures to compensate for image distortion identified by the orientation measures.

G1. A method of identifying areas of image data that are likely to include a digital watermark, the image data corresponding to a document comprising a first area and a second area including, respectively, a first digital watermark and a second digital watermark, wherein the first digital watermark includes a first orientation component and the second digital watermark includes a second orientation component, and wherein the document further comprises a visible fiducial, said method comprises:

segmenting the image data into a plurality of portions;

determining an orientation parameter for at least some of the portions relative to the visible fiducial;

identifying from the determined orientation parameters, at least two prominent orientation parameters, wherein portions of the image data that corresponds to the prominent orientation parameters are identified as areas of image data that are likely to include a digital watermark.

Introduction to Appendix A

Reference is now made to the accompanying Appendix A, which is herein incorporated by reference. Appendix A details various additional identification document security features that can be used in combination with digital watermarking, including multiple digital watermarks. Indeed, use of these additional security features provides a layer-security approach—making it even more difficult for a potential forger to successfully replicate an identification document.

In addition to providing a layered security feature, we note that many of these security features can cooperate with a digital watermark. For example, a radio frequency-based security feature may include a code for comparison with (or to unlock or decrypt) a code or message carried by a digital watermark, or vice versa.

As a further example, a fragile or semi-fragile digital watermark can be embedded or laser engraved in a security laminate. If the laminate is tampered with (e.g., manipulated, removed and/or replaced) the fragile watermark will be destroyed or predictably degraded.

In addition, a watermark may be embedded in many of the security features discussed in Appendix A, like fine line printing (background), holograms, optical watermarks, seals and spot colors, to name but a few.

Still further, one or more digital watermark may be embedded with ultra-violet inks, optically variable inks, specialized inks, infrared inks, etc. In some cases, we anticipate embedding a first digital watermark with conventional ink, while we embed a second digital watermark with one of the specialized (e.g., UV, IR, optically variable, etc.) inks described in Appendix A. The two digital watermarks may cooperate with each other, or may correspond with text (or microprinting) that is providing on an identification document substrate.

A watermark can also cooperate with biometric information carried by the identification document. In a first implementation, the digital watermark includes a payload having a key to decrypt or decode biometric information stored in a 2-D barcode or magnetic or RF storage carried on the card. In a second implementation, the digital watermark includes information that is redundant with biometric information carried by another security feature. Comparison of the digital watermark information and the biometric information reveals whether the identification document is authentic. In a third implementation, the digital watermark includes at least a portion of a biometric template. Once decoded, the biometric template is used to help authenticate the identification document or to convey information.

Of course additional combinations of these security features are anticipated. In some cases, the combination will include digital watermarking, and in other combinations they will not include digital watermarking.

For example, possible combinations might be:

H1. A security document comprising:
a substrate;
a first graphic carried by the substrate, the first graphic conveying a photographic image to human viewers thereof,
the first graphic being steganographically encoded to convey first plural bits of digital data recoverable by computer analysis of said first graphic; and
a second graphic carried by the substrate, the second graphic conveying a visual image to human viewers thereof, wherein the second graphic is steganographically encoded to convey second plural bits of digital data recoverable by computer analysis of said second graphic;
and a security feature carried by the substrate.

H2. The security document of H1, wherein the steganographically encoded first plural bits of digital data and the steganographically encoded second plural bits of digital data cooperate to verify authenticity of the security document.

H3. The security document of H1, wherein the security feature comprises at least one of a deliberate error, a known flaw, fine line background, ghost image, laser encoded optical image, laser engraving, laser perforation, microprinting, a Moiré Pattern, overlapping data, rainbow printing, and security code printing.

H4. The method of H1, wherein the security feature comprises ultra-violet ink.

H5. The method of H4, wherein the steganographically encoded first plural bits of digital data and the steganographically encoded second plural bits of digital data cooperate to verify authenticity of the security document, and wherein at least one of the first plural bits of digital data and the second plural bits of digital data cooperate with the security feature to verify the authenticity of the security document.

Conclusion

The foregoing are just exemplary implementations of the present invention. It will be recognized that there are a great number of variations on these basic themes. The foregoing illustrates but a few applications of the detailed technology. There are many others.

To provide a comprehensive disclosure without unduly lengthening this specification, applicants incorporate by reference, in their entireties, the disclosures of the above-cited patents and applications. The particular combinations of elements and features in the above-detailed embodiments are exemplary only; the interchanging and substitution of these teachings with other teachings in this application and the incorporated-by-reference patents/applications are also contemplated.

The section headings in this document are provided for the reader's convenience, and are not intended to impose limitations on the present invention. Features disclosed under one section (or embodiment) heading can be readily combined with features disclosed under another section (or embodiment) heading.

While some of the preferred implementations have been illustrated with respect to identification documents the present invention is not so limited. Indeed, the inventive methods can be applied to other types of objects as well, including, but not limited to: checks, traveler checks, banknotes, legal documents, printed documents, in-mold designs, printed plastics, product packaging, labels, photographs, etc.

Also, while some of the implementations discuss embedding first and second digital watermarks, an alternative implementation embeds a single watermark having a first payload component and a second payload component. The first payload component can be embedded, e.g., in a photograph and the second payload component can be embedded, e.g., in a graphic or artwork. The first payload component and the second payload component can be cross-correlated or intertwined to evidence an authentic identification document, as discussed in the above implementations and embodiments.

Although not belabored herein, artisans will understand that the systems and methods described above can be implemented using a variety of hardware and software systems. Alternatively, dedicated hardware, firmware, or programmable logic circuits, can be employed for such operations. Also, some implementations described in the detailed description suggest that some of the methods or functionality can be carried out using computers or electronic processing circuitry executing software. While this may be a preferred implementation, the present invention is not so limited. Indeed the methods and functionality may be achieved by other means, such as dedicated hardware, firmware, programmable logic circuits, etc.

In view of the wide variety of embodiments to which the principles and features discussed above can be applied, it should be apparent that the detailed embodiments are illustrative only and should not be taken as limiting the scope of the invention. Rather, we claim as our invention all such modifications as may come within the scope and spirit of the following claims and equivalents thereof.

APPENDIX A

The following security measures (see security features table below) can be employed in an identification document to counteract malicious and fraudulent attacks and threats. Some of these attacks and threats include: Counterfeiting, Simulation, Alteration, Photo Substitution and Signature Substitution, Imposters, Internal Fraud and Theft, to name a few.

The above listed types of attacks and threats can be described in terms of covert/overt and the degree of inspection required. Based on a layered security architecture approach, each identification document (sometimes hereafter referred to as a DL/ID card) preferably includes security features that could be used by each of the below three levels of inspection:

First Level—the untrained examiner (e.g., operator through visual observation);

Second Level—the trained examiner (e.g., DMV examiner or law enforcement officer);

Third Level—the forensics examiner (e.g., law enforcement investigator).

To increase the overall security level of the DL/ID card and to protect the cardholder there can be one or more features at each of the three levels of inspection to maximize the protection against the possible threats.

The following "Security Features" chart provides some security features that can be used to help secure identification documents. Of course the descriptions given for the features are not meant to be limiting, but are provided by way of example. The security features can be used to counter different threats as well. And, as we discuss below, we preferably employ a layered approach, meaning that two or more the below security features are used per identification document.

Security Features Table

| Security Feature | Type | Threat Countered | Inspection Level | Description |
|---|---|---|---|---|
| Biometric | Covert/ Forensic | Counterfeit/ Simulation, Photo/ Signature Substitution, Alteration, and Imposters | Second/ Third | A biometric template of the applicant that is stored on the machine-readable feature of the card and/or in the central system for future verification and investigation purposes. |
| Biometric Logon | Covert/ Forensic | Internal Fraud | Second/ Third | A biometric template that is time stamped and stored in the audit file of the system. |
| Core Inclusion | Overt/ Forensic | Counterfeit/ Simulation | First | It is possible to manufacture a plastic document with several different layers of core stock. A colored core material can be added to the card construction to create a colored edge along the card. This technique is currently used in the new INS Work Permit Card as a means of identifying a genuine document. |
| Deliberate Errors or Known Flaws | Covert | Counterfeit/ Simulation | Second/ Third | A feature or attribute known only to the manufacturer or inspection officials. |
| Directional Metamerism | Overt/ Forensic | Counterfeit/ Simulation | Second | Directional metamerism refers to the use of colors that differ in spectral composition but match one another under certain lighting conditions. Using this technique, designs can be created that will show colors that appear to be identical under incandescent light but, under colored light, appear as different colors and patterns. |
| Digital Watermark | Covert/ Forensic | Counterfeit/ Simulation, Photo/ Signature Substitution, and Alteration | Second/ Third | A secure and machine-readable feature that is embedded in the DL/ID and is generally imperceptible to the human eye while being readable by a watermark reader. In some cases, the watermark is secure. Digital watermarking fits within the DL/ID design and does not take up any significant real estate on the card, e.g., since it is embedded in card features or background. Digital watermarking may enable standardized machine based cross-jurisdictional authentication and forensic analysis of the DL/ID without a need for standardized card design. |

-continued

Security Features Table

| Security Feature | Type | Threat Countered | Inspection Level | Description |
|---|---|---|---|---|
| Embossed Characters | Overt | Alteration | First | Embossing is the impressing of raised characters to render a tactile pattern. The raised characters will also render the card uneven/not flat, thereby making the card more difficult to reprint. It is possible to develop unique embossing characters or logos that would not be included in commercially available embossers. |
| Fine Line Background | Covert | Counterfeit/ Simulation | First/Second | Commonly called "guilloche patterns," this detailing prevents accurate reproduction by copiers or standard document scanners, especially when used in conjunction with Rainbow Printing. A fine line background is constructed by using two or more intricately overlapping bands that repeat a lacy, web-like curve pattern on fine unbroken lines. |
| Ghost Image or Ghost Printing | Overt | Alteration | First | Digital printing technology has made possible the printing of a "ghost" image, a half tone reproduction of the original image, which is typically printed in the same area as the personal data. The second image appears as a light background to text data, significantly increasing the difficulty of altering the photo image or the data. |
| Holograms | Overt/ Forensic | Counterfeit/ Simulation | First | A hologram is a microscopically fine diffraction structure by which two or three-dimensional images are generated. The metallized reflective hologram has been a security feature for Visa and MasterCard cards for more than 10 years. The intrinsic security of the hologram results from a moveable image when viewed from different angles. It is not receptive to photography, photocopying, or scanning, and it requires highly specialized equipment to replicate designs. |
| Ink Taggants | Covert/ Forensic | Counterfeit/ Simulation | Second/ Third | Special inks have been formulated with specific elements called taggants. These elements react to electromagnetic energy sourced from a remote reader. By using these inks and measuring their reflection, it is possible to identify designated card groupings or types. These taggant-carrying products are known as smart (or intelligent) inks. |
| Kinegrams | Overt/ Forensic | Counterfeit/ Simulation | First | Kinegrams, like holograms, can be produced on a reflective or transparent material. However, unlike holograms, Kinegrams have only two-dimensional effects, and effects are observable under a wider variety of lighting conditions. Also, Kinegrams can incorporate asymmetric optical effects that are different optical variable effects which are viewable as the Kinegram is completely rotated (360 degrees). |
| Laser-Encoded Optical Image | Overt/ Forensic | Alteration Photo Substitution and Counterfeit/ Simulation | First/Third | The image and text files used to personalize and issue a document is laser-encoded on to optical WORM media as a visible diffraction pattern image that is eye-readable under a variety of lighting conditions. The personalized laser-encoded optical image is extremely difficult to simulate as it has a two-dimensional appearance and the encoding registration on to the optical WORM media is at a sub-micron level of accuracy. The laser-encoded optical image cannot be removed from the reflective optical WORM media nor can it be duplicated or simulated by photocopying, photography or scanning. The laser-encoded optical image can be updated by incorporating new diffraction pattern images or alphanumeric text as the document is updated or processed. Furthermore, covert physical protection can be added by interleaving a copy of the digital file within the laser-encoded optical image. This personalized security feature is currently used in the Permanent Resident Card ("Green Card") issued by the U.S. Immigration and Naturalization Service and the Border Crossing Card issued by the U.S. Department of State. |
| Laser Engraving | Overt/ Forensic | Alteration | First/Second | Laser engraving has been used in Europe for more than 10 years on high-security plastic cards for printing highly tamper-resistant variable data on a card. Using an intense laser beam, data is burned (or "engraved") into the inner core of the card. The information cannot be mechanically or chemically removed without damaging the surface of the card, thereby providing an extremely effective tamper-resistant barrier. Laser |

-continued

Security Features Table

| Security Feature | Type | Threat Countered | Inspection Level | Description |
| --- | --- | --- | --- | --- |
| Laser Perforation | Overt/ Forensic | Alteration | First/Second | engraving can be performed with alphanumeric characters digitized images (such as photos or signatures), or bar codes and OCR characters. This is the perforation of a document using laser technology. Unlike mechanical punching techniques, the holes made by the laser beam are free from burrs and can easily be confirmed by feeling. The holes created are also conical shape, with the entrance being larger than the exit. |
| Machine-Readable Technologies | Covert | Counterfeit/ Simulation | Second/ Third | The card design can incorporate inclusion of many machine-readable technologies such as magnetic stripe, integrated circuit, 1D or 2D bar-codes, OCR, optical WORM media, machine-readable holograms, etc. Verification of the authenticity of the document, the data, and/or the person presenting the document can be accomplished with a card reader, depending on the technology employed. Common techniques to ensure data integrity include: Check digits and data encryption (presumably with public key encryption); and, For IC cards, tamper detection and chip disabling; and digital signatures for all data written to the chip. |
| Metallic and Pearlescent Inks | Overt/ Forensic | Counterfeit/ Simulation, Alteration and Photo/ Signature Substitution | First | Special iridescent inks fluctuate in brilliance depending upon the angle of illumination and viewing. The typical appearance of metallic or pearl luster inks cannot be mimicked by color copiers or reproduced by scanning and reprinting. |
| Micro Optical Imaging | Overt/ Forensic | Counterfeit/ Simulation, Alteration and Photo/ Signature Substitution | First/Second | Text, line art, gray scale images and multi-reflectivity images can be engineered into optical WORM media at a resolution over 12,000 dpi. This extremely high resolution is over 4 times higher than current security printing techniques and therefore extremely difficult to simulate. The micro optical images cannot be removed from the reflective optical WORM media nor can it be duplicated or simulated by photocopying, photography or scanning. Micro optical imaging is mainly made up of visible images but can also incorporate digital data that can be used for covert machine-readable security. Micro optical imaging is currently used in the U.S. Permanent Resident Card, Border Crossing Card and several other commercial applications. |
| Microprinting | Overt/ Forensic | Counterfeit/ Simulation | Second | Miniature lettering, which is discernible under magnifying readers, can be incorporated into the fine line background or can be placed to appear as bold lines. Visa, MasterCard, and American Express include microprint as a standard security feature. Microprint was also added to U. S. currency in 1990. Accurate reproduction of microprint cannot be accomplished as yet by photocopying or by commercially available color photography or color scanners. |
| Moire Pattern | Covert | Counterfeit/ Simulation, Alteration, and Photo Substitution | First/Second | A new pattern formed by the super positioning of two patterns whose periodicities are not identical. Security designs can be made so that a scanner or copier will only display part of the pattern, resulting in a visible effect different from the original document. The original image can be designed so that a copy would reveal indication of reproduction —typically showing the word "VOID" or "COPY". This process is also referred to as aliasing. |
| Opacity Mark | Overt | Counterfeit/ Simulation | First | The opacity mark, which is similar to a watermark, is a plastic that contains a unique translucent opacity mark. It is similar in principle and effect to a watermark found in paper documents and enjoys a high level of familiarity as a security feature. |
| Optical Variable Device | Overt | Counterfeit/ Simulation, Photo Substitution, and Alteration | First/Second | Optically Variable Device (OVD) is a general term describing a security feature which changes appearance in some way when the angle of illumination or observation is changed. OVDs derive their significance for valuable documents and goods from the impossibility of copying them with usual reproduction techniques like color scanners and copiers. OVDs are often distinguished by being identified as either iridescent or non-iridescent. |

-continued

Security Features Table

| Security Feature | Type | Threat Countered | Inspection Level | Description |
|---|---|---|---|---|
| Optical Watermark | Overt | Counterfeit/ Simulation and Alteration | First/Second | Fine line images can be engineered into optical WORM media at a resolution over 12,000 dpi. The optical watermark is then overwritten with a laser-encoded optical image, interlocking in sub-micron register, and a preformatted document security feature with a laser encoded personalization security feature. This extremely high resolution is over 4 times higher than current security printing techniques and therefore extremely difficult to simulate. The optical watermark cannot be removed from the reflective optical WORM media nor can it be duplicated or simulated by photocopying, photography or scanning. Attempting to tamper or alter the optical watermark destroys the laser-encoded optical image. The optical watermark is currently used in the U.S. Permanent Resident Card and Border Crossing Card. |
| Optically Variable Inks | Overt | Counterfeit/ Simulation | First | Optically variable inks (OVI) can be incorporated into designs to create a striking color shift (for example, green to purple, gold to green, etc.) depending on the angle of light used in viewing the card. This material consists of a transparent colorless ink containing microscopic, advanced multi-layer interference structures. OVI is precious, and production is available to secure printers only. Since the availability of these inks is highly restricted, true counterfeiting is unlikely. |
| Overlapping Data | Overt | Alteration and Photo/ Signature Substitution | First | Variable data, such as a digitized signature or text, can be overlapped with another field, such as a photo image. This technique makes it necessary to alter both fields if either one of them is changed, thereby increasing the tamper resistance of the card by making it more difficult to alter. |
| Radio Frequency Technology | Covert | Counterfeit/ Simulation, Alteration, Photo/ Signature Substitution | Second/ Third | Use of radio frequency waves to activate and retrieve information from another source. |
| Rainbow Printing | Overt | Counterfeit/ Simulation, Alteration | First | Sometimes called iris printing, involves a very subtle shift in color across a document. Well-designed patterns cannot be accurately reproduced on color copiers or through the use of document scanners. Widely perceived in Europe and Asia as an element of a secure document design, it is commonly used in conjunction with a fine line or medallion pattern in the background of the document. |
| Redundant Data | Overt | Alteration | First | Data can be displayed in more that one location on the ID, thereby raising the resistance to alteration. A simple visual inspection is required to determine if all data fields match. Redundant data can also be displayed in differing colors or fonts. |
| Retroreflective Devices | Overt | Counterfeit/ Simulation, Alteration and Photo/ Signature Substitution | Second | Optical constructions that reflect light such that covert logos become visible over the entire document, and/or overt logos become more visible and reflective, when the document is viewed using a focused light source. |
| Seal/Signature over Photo/ Information | Overt | Photo/ Signature Substitution | First | A type of unique identification that overlaps the photo and text area. It can be a specific equipment number, state seal, coat of arms, flag, etc. The significance of this is to deter substituting the photo and/or personal information. |
| Security Bonding | Covert | Alteration and Counterfeit/ Simulation | Second | The card periphery on an optical memory card can incorporate a security bonding material with known characteristics to bond all layers together. Tampering with the card periphery in an attempt to access internal structures damages the known characteristics within the security bonding. This creates a tamper evident feature. |
| Security Code | Covert | Counterfeit/ Simulation, Alteration, and Theft of Components | Second/ Third | It is possible for high-resolution color printing systems to print a security code within the body of the color printed photograph. For example, a security code can be printed in a non-proportional font that can imbed characters on the edge or the bottom of the printed picture. The text can be printed on the image in colors that are complementary to the image or in black. |

-continued

Security Features Table

| Security Feature | Type | Threat Countered | Inspection Level | Description |
|---|---|---|---|---|
| Security Laminate | Overt | Alteration and Counterfeit/ Simulation | First/Second | Transparent layers or films with an integrated security feature can be applied to a document with an adhesive or fused by heat. Available in a number of forms security laminates are designed to protect a document from alteration and provide tamper evidence. |
| Security Thread | Overt | Counterfeit/ Simulation and Alteration | First/Second | First seen in U.S. banknotes the thread is visible by viewing in reflected or transmitted light and can have text (positive or reverse) or other features on/in the thread. Security threads can be metal or plastic, transparent or opaque, colored or colorless. With special metallized film, demetallized text is invisible in reflected light and therefore cannot be copied reprographically. When viewed in transmitted light, however, the opaque aluminum letters are clearly visible. |
| Specialized Inks | Covert/ Forensic | Counterfeit/ Simulation | Second/ Third | Special inks have been formulated with specific elements called taggants. A remote reader or viewer can detect these elements. By using these inks and measuring their presence, it is possible to identify designated card groupings or types. These taggant-carrying products are known as smart (or intelligent) inks. |
| Spot Color | Covert/ Forensic | Counterfeit/ Simulation, Photo/ Signature Substitution, Alteration, and Imposters | Third | Special artwork combined with pantone inks can be used to pre-print images on card core stock that cannot be scanned and then printed using cyan (C), magenta (M), yellow (Y) and black (K) technologies without a trained observer using a simple magnifying device being able to discern the difference in the artwork. Typical laser and inkjet printers use a series of different colored dots that are combined to print the image; the spot color image uses dots of a single color. |
| Thin-Film Interference Filters | Overt | Counterfeit/ Simulation | Second | Multiple-layer structures that produce color effects by interference. |
| Transparent Holograms | Overt/ Forensic | Alteration and Counterfeit/ Simulation | First/Second | It is possible to incorporate holographic effects in a clear, transparent topcoat that can be applied over variable printing. Through careful design and physical registration, the clear holographic topcoat can serve as a deterrent to alteration in addition to its counterfeit protection features. If an attempt is made to remove or alter the topcoat, tampering will be detectable without the need of special equipment. Because the transparent hologram design reflects light at differing angles, accurate reproduction with a copier or scanner is cannot be accomplished. |
| Ultraviolet (UV) Printing | Covert/ Forensic | Counterfeit/ Simulation, Photo/ Signature Substitution, and Alteration | Second | Ultraviolet ink, which can be applied either through offset or silkscreen techniques, has long been accepted as a security feature for plastic cards. This invisible printing can be produced with the availability of a color shift when viewed under long-wave UV light sources. UV radiation is not visible to the human eye, but becomes visible when irradiated with a UV light. Custom UV fluorescing colors can be formulated that are not normally available commercially, thereby increasing resistance to counterfeiting. |
| Void Pattern | Covert | Counterfeit/ Simulation | Second | A security device consisting of a period structure as an overt but not visible feature. When copied on a machine with a different periodicity, the resulting moire pattern displays the word VOID or some other message. |

Specific Security Features

We prefer a layered security approach. Most preferred is when two or more security features are incorporated into a DL/ID card or a card issuing system that address each of the threat types identified above (e.g., counterfeit/simulation, photo/signature substitution, alteration, imposters, internal fraud, and theft).

Full Color Ultraviolet Ink and Digital Watermarks are preferred as minimum-security features. This would provide both human and machine-readable features for authentication of DL/ID cards. In addition, the cost, expertise, equipment, and materials that it would take to reproduce either of these features make the replication process cost prohibitive for those who would wish to counterfeit these features.

Data that Identifies Easily Defeated Security Measures

We are not aware of any data or research that identifies commonly and/or easily defeated security measures and the methods used by counterfeiters to defeat them. However, our current experience indicates that it is nearly, if not impossible to defeat the current generation of secure DL/ID documents produced using a layered security architecture approach and feature set. As a result, the more sophisticated counterfeiters focus on obtaining, from an illegal means, the equipment and materials necessary to produce the documents.

Other experience has indicated that the ability of the counterfeiter to defeat the security measures in a DL/ID card is related to the sophistication of the DL/ID card. DL/ID cards with few security features are far easier to counterfeit than the current generation of DL/ID cards. There have been reported incidences of counterfeiting of the older generation of DL/ID cards that are still acceptable in a given state since that particular generation of card had few, if any, security measures. This experience points to the value of a sophisticated state-of-the-art DL/ID card with a layered security architecture. It also suggests that valid card life needs to be of a shorter duration rather than a longer duration to ensure that the latest security technologies are in force and that the older technologies are retired from service.

We have observed that the security features designed in today's generation of DL/ID cards cannot be counterfeited without the systems used for their legal and authorized production. The equipment used by counterfeiters cannot produce exact copies of properly designed DL/ID cards. The counterfeited documents are most frequently used to obtain age-controlled products and services where the point-of-sale is not equipped to perform sophisticated identification or authentication of the cardholder or validate the authenticity of the DL/ID card (e.g., the counterfeited document is "good enough" to gain admittance to a "21 or over" club).

Minimum Security Features

Today a preferred number of security features specified for a DL/ID card is one overt security feature and one covert security feature. We prefer a layered security approach such that each identification card implements at least a minimum number of security features for each level of inspection.

At each inspection level, each document issuing agency preferably can have an option to select from a range of security features to implement in their respective DL/ID card programs in a manner that is consistent with their card design and issuance philosophy.

Common/Interoperable Security Feature

Digital watermark technology can provide a common and interoperable security feature that can complement the use of existing machine-readable features and emerging security features such as biometrics. Digital watermark technology can provide a common/standard authentication mechanism across jurisdictions regardless of the DL/ID design and other data carrying features.

Most preferably is a minimum of one and probably at least two interoperable security features used to both authenticate and secure the DL/ID card(s). A possible combination of a digital watermark and a 2D barcode feature could be paired up for multiple levels of layered security and end user interoperable DL/ID verification.

Aid in Forensic Document Examination

We suggest that if a minimum number of forensic security features are specified in the card design specification together with a layered security document architecture, forensic documentation examination will become easier to perform and more conclusive in the results. For example, the following features could be included in a layered security architecture that greatly enhance forensic document examination.

Embedded Digital Watermarking

Use of Infrared Ink

Use of Full Color Ultraviolet Inks

Card Body Material Specifications

We prefer a Teslin-enriched or a polycarbonate material be specified for the card body material (or substrate) so that layered security features can be implemented on the DL/ID document.

The card body material can be an enhancement of the DL/ID document as it may interact with the layered security architecture design to provide a complete and secure solution. The card body material may support the security design features, with respect to the printing of the features and the inks used to implement the security features, and interact with the front and back laminates to secure the features. The card body material may also be selected so that any attempt to alter the card invalidates the card rendering it useless.

A Teslin-enriched or polycarbonate card provides a suitable material to enable the layering of security features on the card.

Other Security Features in Card Body Material

There are several other security features that could be incorporated into card body materials. These features include: the serialization of the card stock to provide inventory and audit control of the card stock material; the use of forensics to support the identification and authentication of the user; and, the use of ultraviolet (UV) and infrared (IR) inks to prevent fraudulent document duplication.

The use of "Spot" colors incorporated with micro printing can also be used. "Spot" colors are virtually impossible to scan and duplicate. We note that a digital watermark can be embedded into a spot color.

Factors in Printing DL/ID Cards

There are often two dimensions to address related to the printing of DL/ID cards; the location of the print function and the security features printed on the card.

Where a card is printed will affect the security of the print function. Centrally produced cards benefit from security inherent in the process, including: a single secure printing facility; the ability of the vendor to conduct background investigations and monitor its employees; and, the controlled manufacture and delivery of the cards. Notwithstanding the method of production—centralized or decentralized—the operator of the capture station should also be controlled throughout the image capture and card printing process.

We sometimes recommend the use of the "Bio Log On" feature to ensure printing station operator authentication and authorization. (A bio-log on features ties an operator to the printing process through an identifier or unique biometric characteristic.). The use of this feature creates an audit trail between the printing station operator and the DL/ID cards printed. In addition the use of a biometric log on feature renders the workstation inoperable to unauthorized users.

Once a jurisdiction has taken actions to control the printing function it can turn to a myriad of printed security features to protect the card from various security threats.

We prefer that Digital Watermarking and, e.g., Full Color Ultraviolet Printing be specified printing features. These extremely complex features protect cards from virtually every security threat, save internal fraud and imposters. Our experience shows that because of the expense, knowledge, equipment, and ability required, reproducing these features is beyond the realm of today's counterfeiters and regeneration artists.

Additionally, we recommend that the following printing features be considered to be included in a minimum feature set for all DL/ID cards.

Deliberate Errors or Known Flaws

Fine Line Background

Ghost Image

Laser Encoded Optical Image

Laser Engraving/laser Perforation
Microprinting
Moiré Pattern
Overlapping Data
Rainbow Printing
Security Code Printing
Specialized Inks DL/ID Cards Protected Against Copying It is our assumption that cards are primarily copied for the purpose of subsequent fraudulent and unlawful regeneration. DL/ID cards embedded with Digital Watermarks (DWM) can be designed to be invalid after unlawful duplication and regeneration. Our preferred implementation is that each DL/ID document be embedded with two or more digital watermarks. The two or more digital watermarks working in tandem can provide crosschecking data as well as data alteration detection. Additionally, a DWM may become part of the DL/ID document, e.g., if it is embedded in a feature like an image and, as a result, it would become tied to the document making it highly secure, resistant to counterfeiting and does not take up any real estate on the document. The DWM is generally imperceptible to the human eye, but can be detected using an authorized, audience-specific, secure reader application.

One implementation uses two or more digital watermarks to thwart common driver license document counterfeiting and alteration attacks across multiple user environments. Other implementations use one watermark. Other implementation uses three or more digital watermarks.

Any attempt to create a good simulation of the DL/ID card from a legitimately issued card will be detected using a secure reader device/application. This detection will be made because the modification of data on the card after copying the card image will result in failure to pass the crosschecking of the two digital watermarks' content during the authentication process. In addition, the forensic application capability of the digital watermark can provide the ability to trace the simulated card to its origin.

Other non-machine readable security features that will protect the DL/ID cards from duplication include the use of UV and IR inks, micro printing and the use of "Spot" coloring. Because of their (color) chemical composition, "Spot" colors are virtually impossible to duplicate or scan.

Personalization Process Secured

The following actions identify some of the ways that the personalization process for a DL/ID card can be secured.

Card material, ribbon and lamina features should not be commercially available.
Standardize on Landscape (Over 21) and Portrait (Under 21) DL/ID card types.
Card material could have a unique covert inventory control number that a camera/sensor could read and match to an inventory control list for that facility from the main system. Only if a match is found will the printer print a DL/ID card.
Layered overt and covert for casual, trained, and forensic level security in the card material, printing process, and lamina should be used.
Card Personalization software could have the Graphic Background images loaded from the central site each day and not maintained on a local disk.
All or part of the applicant data could be encrypted and/or could be stored on a removable storage vault device.
Capture Software could be disabled by having key components of the application(s) stored at the central site or on removable storage vault devices.
Biometric logons and final biometric authorization could be used to finalize a transaction and keep a biometric audit of who did what and when they did it.

The following list identifies examples of printing/manufacturing processes that can be used to produce the DL/ID card (from card blank to card personalization).

Standardize on Landscape (Over 21) and Portrait (Under 21) DL/ID card types.
Card materials could have a unique covert inventory control number that a camera/sensor in the printer could read and match the inventory control number to an inventory control list for that facility from the main system. Only if a match is found will the printer print a DL/ID card.
Layered overt and covert security features for casual, trained, and forensic level security in the card material, printing process, and lamina could be used.

Method for Assessing Greatest Security Risks

A jurisdiction could obtain the services of a Materials Science organization such as Digimarc ID Systems' Materials Science organization that could perform an assessment of the security risks associated with their DL/ID documents. A Materials Science technical staff has the training, experience, and relevant expertise to analyze the DL/ID documents and assess the risks associated with the document, its method of production, the materials used to construct the document, and the features used to secure the document. Based on the analysis, a risk assessment can be prepared together with recommendations on ways to increase the security level of the document and reduce security risks.

Secure Card against Alteration and Counterfeit

A layered security architecture and associated security features provides a method that to deter alteration or counterfeiting. In addition to printed security features, lamination security features, the use of Digital Watermarks, and biometrics, other physical methods of securing the DL/ID can include the use of multiple physical design templates for specific user groups. For example, Age Group Card Layout templates can be created for DLs issued to operators under 21 and 21 and over. Typically, a vertical or portrait layout is used for the under 21 DL and a horizontal or landscape layout is used for the 21 and over DL. Similarly, templates can be designed specially for a child ID.

Layered Security

We suggest a layered security architecture, as discussed throughout this document, for DL/ID card physical security. We suggest that a layered security architecture that is built on overt features, covert features, and forensic features will lead to DL/ID documents with the most robust physical security features supported by current technology.

Business Processes

We suggest that there are business processes in card issuance that can impact the overall physical security of DL/ID cards. The following list identifies some of the processes that can be reviewed and assessed to determine the impact of the physical security of the DL/ID card.

Type of Card Issuance (Central Issue vs. Decentralized Issue)—The physical security of central issuance is significantly greater than the physical security of decentralized issue due to the reduced number of facilities to secure. A highly secure single facility allows tighter control of employees, equipment, consumable supplies (e.g., card stock, laminates, ink, etc.) and allows for easier surveillance than multiple sites that would be included in decentralized issue environment.
Operator Background Checks—In addition to the production of a secure DL/ID document it is equally important to protect against the security threat presented by system operators. All persons associated with the production and issuance of DL/ID documents preferably undergo a complete background check by a law enforcement agency such as the Federal Bureau of Investigation and be subject to periodic review and update. Additionally, the use of a "Bio Log On" security feature to ensure that personnel associated with the production and issuance of DL/ID documents are authenticated and authorized to perform their job function can be used.

Customer Processing—As part of a layered security architecture the use of Biometrics to increase the physical security of the DL/ID card issuance process is preferred. A combination of security features associated with the printing of DL/ID documents and biometrics (e.g., facial recognition systems and fingerprint matching systems) can significantly reduce the probability of fraud in the DL/ID issuance process.

Reasons for Centralized Issuance

We suggest that central issuance is the most secure approach to document issuance. The following list identifies some of the reasons to consider centralized issuance.

Easier and more cost effective to maintain as well as deploy system enhancements and take advantage of new technology with centralized issuance Quality, uniformity, and processing of DL/ID documents are easier to control with centralized issuance Multiple levels of collusion required to defraud centralized issuance More secure protection against equipment and/or unique materials theft Processing speed is greater with centralized issuance Easier to train operators with centralized issuance Advantages to Decentralized or Hybrid Issuance Systems Nevertheless, there are some advantages for jurisdictions to continue decentralized or hybrid issuance. Decentralized issue enhances security because card delivery is controlled. No cards are lost, returned as undeliverable, or stolen from the mail. Hybrid systems allow jurisdictions to concentrate security investigations on specific target groups, which allows for increased return on their security investment. Organizationally, these methods provide a high level of customer service. The applicant is presented the document on demand and is equipped with proper identification immediately. The flexibility of these methods easily allows for emergency and special issuance (employee access cards, Child ID cards, travelers, etc). In addition, decentralized issuance complements the information technology infrastructure that provides the ability to qualify applicants on-the-spot. Budgets can safely be constructed for decentralized issuance without the need to account for unscheduled postage hikes. Finally, these methods accommodate jurisdictions that historically use third party providers to issue the cards.

Jurisdictions should consider the following practices to secure decentralized systems of issuance.

Operator bio-logon
Serialization of card stock
Secure storage and inventory of consumables
Graphic images stored off-site
Purge hard drives daily
No batch updates of work
Encryption of all data Security Recommendations that Effect Maximum Card Lifecycles We suggest that there is a relationship between DL/ID document security features and document lifecycles. An important security consideration is the physical change that occurs over time to the cardholder that can effect the authentication of the card. For example, the physical appearance of the cardholder may change significantly over extended periods of time due to the natural aging process making a DL/ID image obsolete. There is also some evidence that biometrics are impacted by time. The current recommendation is that finger images and facial images be revised every five years.

Another consideration is based on the rate of change of technology. As technology is constantly changing, these changes impact the security features implemented in a DL/ID document. As technology improves and enables the deployment of more sophisticated features, it also may become easier to defeat a security feature based on older technology. Longer document life cycles may actually provide an unintended opportunity for counterfeiters or fraudulent production of DL/ID documents based on older security features. Shorter document life cycles ensure that the most current security technologies are deployed and that the older DL/ID documents are removed from circulation.

Methods for Conducting Risk Assessment of Cards

The following list identifies resources for Risk Assessment.

Digimarc ID Systems Card Material Science and Process Analysis Groups
IAFCI—International Association of Financial Crimes Investigators
Secret Service—Identity and Credit Fraud
Postal Inspectors
Bank Investigators
International Association of Chiefs of Police

What is claimed is:

1. A method comprising:

receiving data corresponding to a detection trigger of an identification document; and determining whether to authenticate the identification document through digital watermarking or through an alternative process, including:

if the received data indicates an expected presence of digital watermarks, authenticating the identification document through the digital watermarking authentication process, wherein the digital watermark authentication process utilizes at least first and second digital watermarks and includes analyzing optical scan data that corresponds to the identification document to attempt to obtain information conveyed by the first and second digital watermarks;

if the information is obtained, cross-correlating at least some of the information conveyed by the first digital watermark with at least some of the information conveyed by the second digital watermark, and providing a signal corresponding to a result of the cross- correlation of the watermark information;

if the information is not obtained providing a signal representing that the identification document is considered suspect;

if the received data indicates an expected absence of digital watermarks, authenticating the identification document through the alternative authentication process, wherein the alternative authentication process utilizes bearer or document specific information and includes attempting to obtain the specific information from at least two sources related to the identification document;

if the specific information is obtained, cross-correlating the specific information, and providing a signal corresponding to a result of the cross-correlation of the specific information; and if the specific information in not obtained, providing a signal representing that the identification document is suspect.

2. The method of claim 1, wherein the detection trigger comprises a document issue date.

3. The method of claim 1, wherein the detection trigger comprises a document expiration date.

4. The method of claim 1, wherein the identification document comprises a magnetic stripe, and wherein the detection trigger is stored by the magnetic stripe.

5. The method of claim 1, wherein the identification document comprises electronic circuitry, and wherein the detection trigger is stored in the electronic circuitry.

6. A method comprising:
receiving data carried by an identification document corresponding to a detection trigger; and
determining whether to authenticate the identification document through digital watermarking or through an alternative process, including:
if the received data indicates an expected presence of digital watermarks, attempting to authenticate the identification document by analyzing digital watermarking carried by the identification document; and
if the received data indicates an expected absence of digital watermarks, attempting to authenticate the identification document through an alternative process.

7. The method of claim 6, wherein the alternative process involves analysis of at least one of data carried by a barcode, data obtained through optical character recognition (OCR), or human inspection of the identification document.

8. The method of claim 6, wherein the detection trigger corresponds to at least one of a document issue date or a document expiration date.

9. The method of claim 6, wherein the identification document comprises electronic circuitry, and wherein the detection trigger is stored in the electronic circuitry.

10. The method of claim 6, wherein attempting to authenticate the identification document by analyzing digital watermarking carried by the identification document utilizes a programmed electronic processor.

11. The method of claim 6, wherein attempting to authenticate the identification document through an alternative process utilizes a programmed electronic processor.

12. The method of claim 6, wherein the identification document comprises text and graphics thereon, and in which the detection trigger comprises a predetermined spatial distance between the graphics and the text.

13. An apparatus comprising:
a memory for storing data associated with an identification document, the data corresponding to a detection trigger; and
an electronic processor configured to:
determine whether to authenticate the identification document through digital watermarking or through an alternative process, including:
if the data indicates an expected presence of digital watermarks, attempting to authenticate the identification document by analyzing digital watermarking carried by the identification document; and
if the data indicates an expected absence of digital watermarks, attempting to authenticate the identification document through an alternative process.

14. The apparatus of claim 13, wherein the alternative process comprises analysis of at least one of data carried by a barcode, data obtained through optical character recognition (OCR), human inspection of the identification document.

15. The apparatus of claim 13, wherein the detection trigger corresponds to at least one of a document issue date or a document expiration date.

16. The apparatus of claim 13, wherein the identification document comprises electronic circuitry, and the detection trigger is obtained from the electronic circuitry.

17. The apparatus of claim 13, wherein the identification document comprises text and graphics thereon, and in which the detection trigger comprises a predetermined spatial distance between the graphics and the text.

18. A non-transitory computer-readable storage medium having instructions stored thereon that, if executed by a computing device, cause the computing device to perform operations comprising:
receiving data carried by an identification document corresponding to a detection trigger; and
determining whether to authenticate the identification document through digital watermarking or through an alternative process, including:
if the received data indicates an expected presence of digital watermarks, attempting to authenticate the identification document by analyzing digital watermarking carried by the identification document; and
if the received data indicates an expected absence of digital watermarks, attempting to authenticate the identification document through an alternative process.

19. An apparatus comprising:
a processor configured to:
receive data corresponding to a detection trigger of an identification document; and
determine whether to authenticate the identification document through digital watermarking or through an alternative process, including:
if the received data indicates an expected presence of digital watermarks, authenticating the identification document through the digital watermarking authentication process, wherein the digital watermark authentication process utilizes at least first and second digital watermarks and includes analyzing optical scan data that corresponds to the identification document to attempt to obtain information conveyed by the first and second digital watermarks;
if the information is obtained, cross-correlating at least some of the information conveyed by the first digital watermark with at least some of the information conveyed by the second digital watermark, and providing a signal corresponding to a result of the cross- correlation of the watermark information;
if the information is not obtained, providing a signal representing that the identification document is considered suspect;
if the received data indicates an expected absence of digital watermarks, authenticating the identification document through the alternative authentication process, wherein the alternative authentication process utilizes bearer or document specific information and includes attempting to obtain the specific information from at least two sources related to the identification document;
if the specific information is obtained, cross-correlating the specific information, and providing a signal corresponding to a result of the cross-correlation of the specific information; and
if the specific information in not obtained, providing a signal representing that the identification document is suspect.

20. A non-transitory computer-readable storage medium having instructions stored thereon that, if executed by a computing device, cause the computing device to perform operations comprising:

- receiving data corresponding to a detection trigger of an identification document; and
- determining whether to authenticate the identification document through digital watermarking or through an alternative process, including:
- if the received data indicates an expected presence of digital watermarks, authenticating the identification document through the digital watermarking authentication process, wherein the digital watermark authentication process utilizes at least first and second digital watermarks and includes analyzing optical scan data that corresponds to the identification document to attempt to obtain information conveyed by the first and second digital watermarks;
- if the information is obtained, cross-correlating at least some of the information conveyed by the first digital watermark with at least some of the information conveyed by the second digital watermark, and providing a signal corresponding to a result of the cross- correlation of the watermark information;
- if the information is not obtained, providing a signal representing that the identification document is considered suspect;
- if the received data indicates an expected absence of digital watermarks, authenticating the identification document through the alternative authentication process, wherein the alternative authentication process utilizes bearer or document specific information and includes attempting to obtain the specific information from at least two sources related to the identification document;
- if the specific information is obtained, cross-correlating the specific information, and providing a signal corresponding to a result of the cross-correlation of the specific information; and
- if the specific information in not obtained, providing a signal representing that the identification document is suspect.

* * * * *

UNITED STATES PATENT AND TRADEMARK OFFICE
CERTIFICATE OF CORRECTION

| | | |
|---|---|---|
| PATENT NO. | : 8,059,858 B2 | Page 1 of 1 |
| APPLICATION NO. | : 11/527361 | |
| DATED | : November 15, 2011 | |
| INVENTOR(S) | : Brundage et al. | |

It is certified that error appears in the above-identified patent and that said Letters Patent is hereby corrected as shown below:

Title page 3, item (56), under "Other Publications", in Column 2, Line 3, delete "Bruce L. DavisV." and insert -- Bruce L. Davis. --.

Title page 3, item (56), under "Other Publications", in Column 2, Lines 5-6, delete "Geoffrey B. RhoadsV." and insert -- Geoffrey B. Rhoads. --.

Column 44, line 52, in Claim 1, delete "cross- correlation" and insert -- cross-correlation --.

Column 44, line 54, in Claim 1, delete "obtained" and insert -- obtained, --.

Column 45, line 1, in Claim 1, delete "information in not" and insert -- information is not --.

Column 45, line 67, in Claim 14, delete "(OCR), human" and insert -- (OCR), or human --.

Column 46, line 49, in Claim 19, delete "cross- correlation" and insert -- cross-correlation --.

Column 46, line 65, in Claim 19, delete "information in not" and insert -- information is not --.

Column 48, line 1, in Claim 20, delete "cross- correlation" and insert -- cross-correlation --.

Column 48, line 17, in Claim 20, delete "information in not" and insert -- information is not --.

Signed and Sealed this
Twenty-ninth Day of May, 2012

David J. Kappos
*Director of the United States Patent and Trademark Office*